United States Patent
Yoshimoto et al.

(10) Patent No.: US 7,557,527 B2
(45) Date of Patent: Jul. 7, 2009

(54) ELECTRICAL POWER CONVERTER AND CONTROL METHOD

(75) Inventors: Kantaro Yoshimoto, Yokohama (JP); Yasuhiko Kitajima, Kamakura (JP); Kengo Maikawa, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 525 days.

(21) Appl. No.: 11/444,161

(22) Filed: May 31, 2006

(65) Prior Publication Data
US 2006/0273748 A1 Dec. 7, 2006

(30) Foreign Application Priority Data
Jun. 1, 2005 (JP) ............................. 2005-161513
Mar. 17, 2006 (JP) ............................. 2006-074652

(51) Int. Cl.
*H02P 7/00* (2006.01)
(52) U.S. Cl. ..................... 318/432; 318/434; 318/139; 318/800
(58) Field of Classification Search ................. 318/434, 318/432, 139, 800
See application file for complete search history.

(56) References Cited

U.S. PATENT DOCUMENTS

| | | | |
|---|---|---|---|
| 5,969,624 A * | 10/1999 | Sakai et al. ............... 340/636.1 |
| 6,268,711 B1 * | 7/2001 | Bearfield ..................... 320/117 |
| 6,342,984 B1 * | 1/2002 | Hussein et al. ................. 360/69 |
| 6,384,489 B1 * | 5/2002 | Bluemel et al. ............. 307/10.1 |
| 6,847,127 B1 | 1/2005 | Lee |
| 6,923,279 B2 * | 8/2005 | Shimane et al. ............. 180/65.1 |
| 7,057,371 B2 * | 6/2006 | Welchko et al. ......... 318/400.27 |
| 7,122,991 B2 * | 10/2006 | Kitajima et al. .............. 318/800 |
| 7,183,728 B2 * | 2/2007 | Kitajima et al. .............. 318/109 |
| 2002/0038732 A1 * | 4/2002 | Sugiura et al. ............. 180/65.2 |
| 2004/0056633 A1 | 3/2004 | Sugiura et al. |
| 2004/0135546 A1 * | 7/2004 | Chertok et al. ............... 320/118 |
| 2005/0111246 A1 * | 5/2005 | Lai et al. ..................... 363/157 |
| 2006/0006832 A1 * | 1/2006 | Kitajima et al. .............. 318/800 |

FOREIGN PATENT DOCUMENTS

EP 1220439 A2 11/2001
JP 2002-118981 4/2002

* cited by examiner

*Primary Examiner*—T C Patel
*Assistant Examiner*—Renata McCloud
(74) *Attorney, Agent, or Firm*—Global IP Counselors, LLP

(57) ABSTRACT

An electrical power converter comprises a first direct current line connected to a first direct current source, a second direct current line connected to a second direct current source, an alternating current line connected to an alternating current motor, a controller, and a pulse generator. The controller determines a required torque of the alternating current motor. The controller also determines a voltage command value that substantially minimizes a copper loss of the alternating current motor while providing the required torque of the alternating current motor. The pulse generator generates an output voltage according to the voltage command value at the alternating current output.

14 Claims, 18 Drawing Sheets

ELECTRICAL POWER CONVERTER AND CONTROL METHOD

This application claims priority from Japanese Patent Application No. 2005-161513, filed Jun. 1, 2005, and Japanese Patent Application No. 2006-074652, filed Mar. 17, 2006, the entire disclosure of each being incorporated herein by reference.

TECHNICAL FIELD

The invention relates to electrical power conversion.

BACKGROUND

A constitution for driving a motor with a high efficiency using a fuel cell as the main power source is disclosed as prior art in Publication of Unexamined Japanese Patent Application No. 2002-118981. Electrical power supply systems may include a battery and a fuel cell connected in parallel to supply power, e.g., to an electric motor. The fuel cell may be operable to charge the battery. Such systems may also include a DC-DC converter, to control the power ratio between the battery and the fuel cell.

In systems which provide DC/DC converters, energy losses are generated in the semiconductor switching and coils of DC/DC converters.

SUMMARY

The purpose of one aspect of the present invention is to provide an electrical power converter without using DC/DC converters which is capable to drive motor in the multiple power sources and to move power from one direct current source to another direct current source when the motor output is small or 0.

Accordingly, embodiments of for electrical power conversion are provided.

An embodiment of the invention is directed to an electrical power converter comprising a first direct current line connected to a first direct current source, a second direct current line connected to a second direct current source, an alternating current line connected to an alternating current motor and a motor torque controller. The motor torque controller generates current command values for the alternating current motor and generates compensating voltage commands values that correspond to charge target values from a source power command value that commands the charge amount from the first direct current source to the second direct current source, a motor torque command value and a motor rotation speed. The electrical power converter further comprises a motor current controller that determines motor voltage commands values according to the current command values, a distributed voltage command value generator that determines command values of voltage that the first direct current source and the second direct current source from a power distributed target value that corresponds respectively to the first direct current source and the second direct current source and the motor voltage command values output to the alternating current motor, a voltage command value compensator that determines compensating distributed voltage command values by calculating the compensating voltage command values from the distributed voltage command values and a pulse generator that generates an output voltage at the alternating current output according to the compensating distributed command values.

In another embodiment, the invention is directed to an electrical power converter comprising a first direct current line connected to a first direct current source, a second direct current line connected to a second direct current source, an alternating current line that drives an alternating current motor, a motor torque control means that generates current command values for the alternating current motor and generates compensating voltage commands values that correspond to charge target values from a source power command value that commands the charge amount from the first direct current source to the second direct current source, a motor torque command value and a motor rotation speed, a motor current control means that determines motor voltage commands values according to the current command values, a distributed voltage command value calculate means that generates command values of voltage that the first direct current source and the second direct current source from a power distributed target value that corresponds respectively to the first direct current source and the second direct current source and the motor voltage command values output to the alternating current motor, a voltage command value compensate means that determines compensating distributed voltage command values by calculating the compensating voltage command values from the distributed voltage command values and a pulse generate means that generates an output voltage at the alternating current output according to the compensating distributed command values.

In a different embodiment, the invention is directed to a method of controlling an electrical power converter comprising generating current command values for an alternating current motor, generating compensating voltage commands values that correspond to charge target values from a source power command value that commands the charge amount from one direct current source to other direct current sources, a motor torque command value and a motor rotation speed, determining motor voltage commands values according to the current command values, generating command values of voltage that a first direct current source and a second direct current source from a power distributed target value that corresponds respectively to the first direct current source and the second direct current source and the motor voltage command values output to the alternating current motor, determining compensating distributed voltage command values by calculating compensating voltage command values from the distributed voltage command values and generating an output voltage to power the alternating current motor according to the compensating distributed command values.

In a different embodiment, the invention is directed to an electrical power converter comprising a first direct current line connected to a first direct current source, a second direct current line connected to a second direct current source, an alternating current line connected to an alternating current motor, a controller, wherein the controller determines a required torque of the alternating current motor, wherein the controller determines a voltage command value that substantially minimizes a power loss of the alternating current motor while providing the required torque of the alternating current motor and a pulse generator that generates an output voltage according to the voltage command value at the alternating current output.

The details of one or more embodiments of the invention are set forth in the accompanying drawings and the description below. Other features, objects, and advantages of the invention will be apparent from the description and drawings, and from the claims.

DETAILED DESCRIPTION

Figure 2:
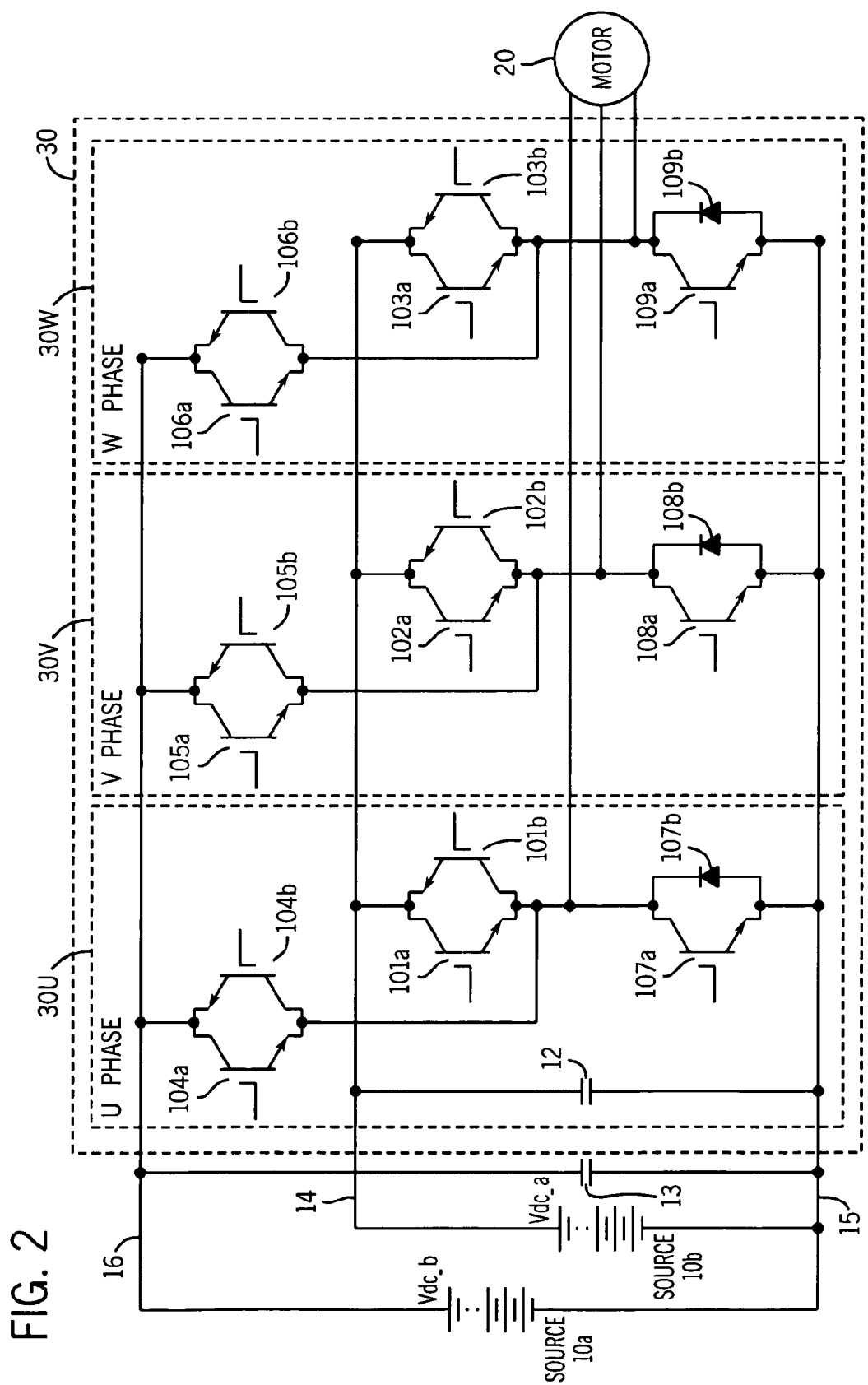
FIG. 2 is a diagram which shows the structure of the power converter for the first exemplary embodiment.

FIG. 2 shows a circuit diagram of the power converter for the first exemplary embodiment. The negative electrode of power source 10a and the negative electrode of power source 10b are connected to the common negative electrode bus line 15. Here, the source 10b is a so-called secondary battery which can be charged and discharged, and the source 10a is a fuel cell battery which can be discharged. However, the invention is not limited to this configuration, and source 10a may also be a secondary battery. Here, there is principally an explanation of charging source 10b from source 10a.

Between the terminals of every phase of the motor 20 and the common negative electrode bus line 15, the semiconductor switches 107a, 108a, and 109a and the group of diodes 107b, 108b, and 109b are connected in the same way to the lower arm of the inverter which is generally known. Between every phase terminal of the positive electrode bus lines of the power source 10a and the motor 20, there is respectively connected conduction in both directions using the controllable semiconductor switches 101a/101b, 102a/102b, and 103a/103b. In addition, also between every phase terminal of the positive electrode bus line 16 of the power source 10b and the motor 20, there is respectively connected the controllable semiconductor switches 104a/104b, 105a/105b, and 106a/106b with conduction in both directions. Between the positive electrode bus line 14 of the power source 10a and the common negative electrode bus line 15, there is established a smooth condenser, and between the positive electrode bus line 16 of the power source 10b and the common negative electrode bus line 15 there is established a smooth condenser 13.

The power converter 30, according to the above 3 potentials for the common negative electrode bus line and the positive electrode bus line of the power source 10a in the positive electrode bus line of the power source 10b, is a direct current-alternating current power converter which generates potential that is impressed on the motor. The switch group 30U, 30V, and 30W of the U-phase, V-phase, and W-phase which is formed using the semiconductor switches established for each phase generates potential which outputs for every phase of an alternating current motor, and connects alternately from the center of these potentials, and by changing the proportions of the connection times, and the necessary voltage is applied to the motor.

Figure 1:
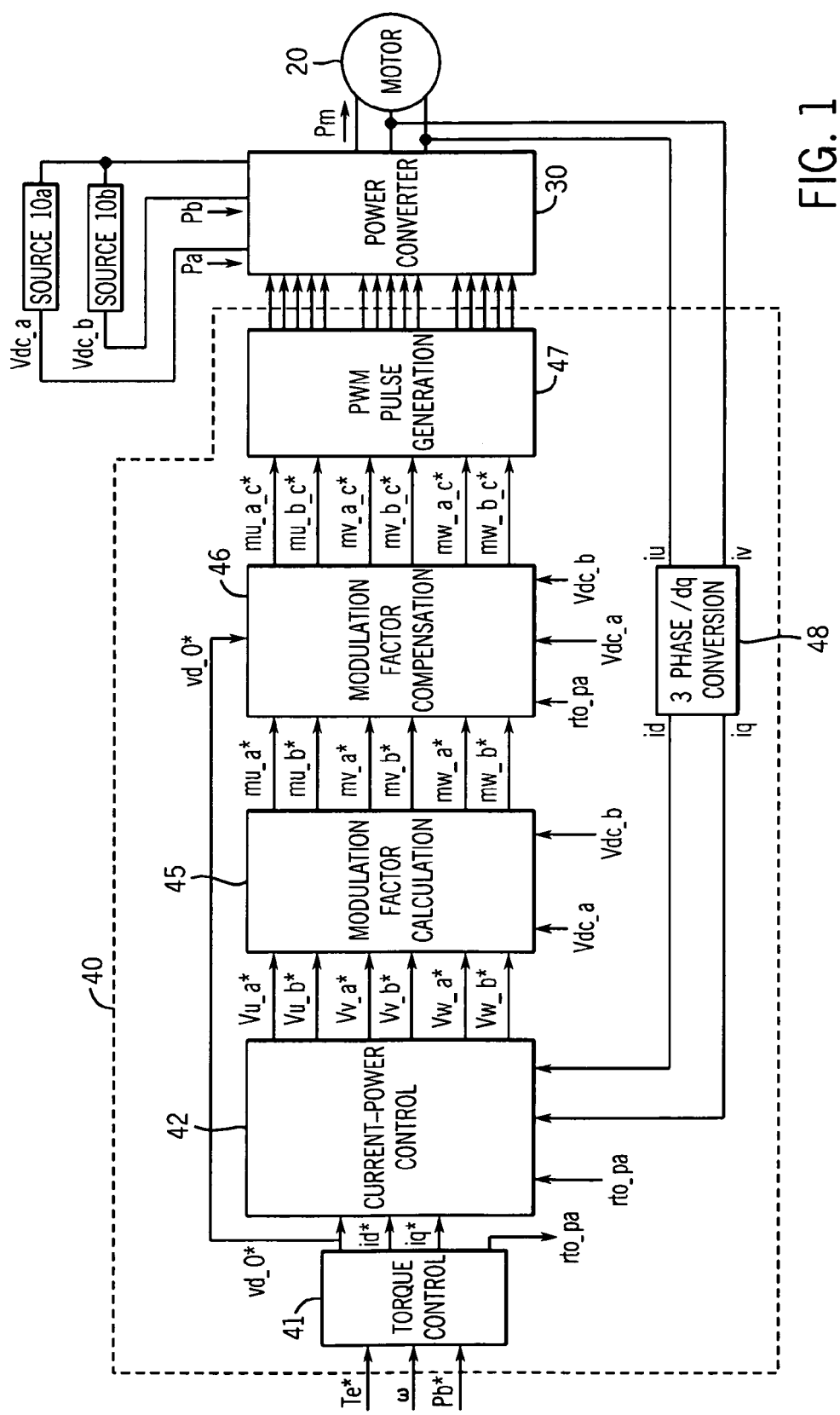
FIG. 1 is a diagram which shows the structure of the control system of a first exemplary embodiment.

Using FIG. 1, there is an explanation of the structure of the control device 40 of the power converter. 41 is a torque controller which calculates, from the torque command Te* which is imparted from the outside and the torque revolution speed ω and the power command value Pb* of the power source 10b which commands the charge amount to the source 10b from the source 10a, the command value id* of the d axis current of the alternating current motor and the command value iq* of the q axis current, the distributed power target value rto_pa, the d axis voltage compensation value vd_0*, and the q axis voltage compensation value vq_0*. The torque controller 41, a motor current command value generator, references the preformed Te* and ω and the third generation map with the three essential elements of Pb* as the axis (that is, a map which contains the below mentioned command value which was precalculated by substituting in the prescribed equation that three essential values), and there is output the motor current command values id* and iq*, the power distribution ratio command value rto_pa, and the compensating voltage command values vd_0* and vq_0.

Here is an explanation in detail of the torque controller 41. When torque controlling a normal motor, it is necessary to determine the current that flows in the motor depending on the toque command Te* and motor rotation speed ω, and in this embodiment, by using toque control, there is imparted specific torque to the motor by flowing an appropriate current (d axis current command value id*, q axis current command value iq*) depending on the toque and the rotation speed.

Figure 18:
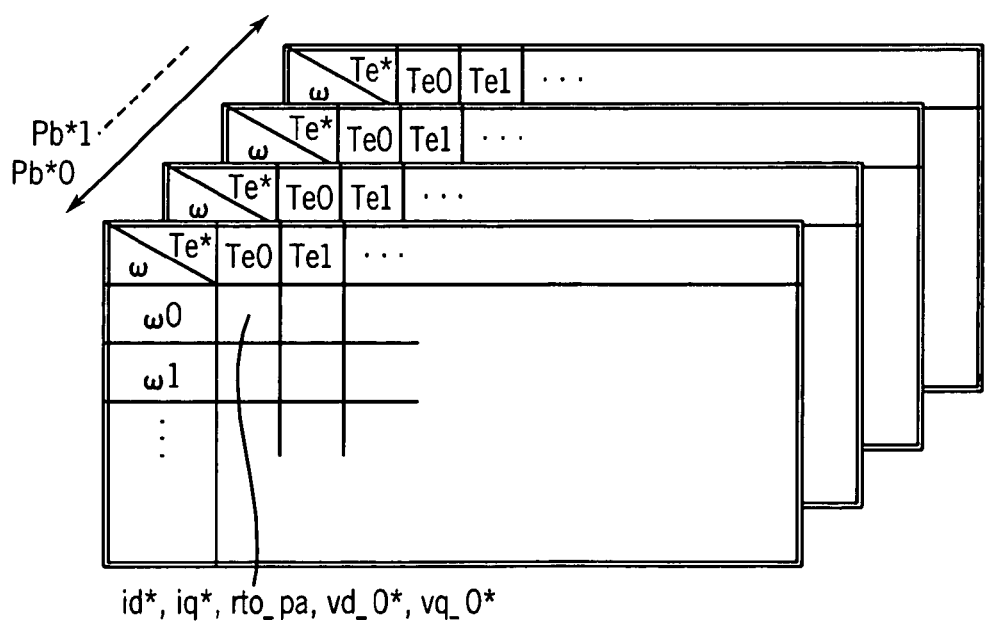
FIG. 18 is a diagram which shows the 3-D map which is used in the first exemplary embodiment.

In this embodiment there is provided as the map shown as one sheet of FIG. 18 the d axis current command value id* and q axis current command value iq* corresponding to the torque command Te* and motor rotation speed ω which are obtained beforehand by experiment. Furthermore, in this embodiment, there is provided a plurality of the maps which correspond to a power command value Pb*, that is, there is formed a 3-D map. Here, the plurality of maps which correspond to the power command value Pb* are calculations according to the d axis current command value id* and q axis current command value iq* which correspond to the torque command Te* and motor rotation speed ω which were obtained beforehand by experiment, and specifically, vd_0* becomes Pb*1/id* and vq_0* normally is established as 0.

In order words, when Pb*=0, for the fixed positions which correspond to Te1 and ω1, id*=id*1-1, iq*=iq*-1, vd_0*=0, and vq_0*=0 are stored, and when Pb*=Pb*1, for the fixed positions which correspond to Te1 and ω1, id*=id*1-1, iq*=iq*-1, vd_0*=Pb*1/id*1-1, and vq_0*=0.

Furthermore, for the fixed positions which correspond to Te0 and ω0 when Pb*=0 (suitable for when either the motor torque command value or the motor rotation speed is 0 or near 0), there is stored id*=0, iq*=0, vd_0*=0, and vq_0*=0, and for the fixed positions which correspond to Te0 and ω when Pb*=Pb*1, there is stored id*=X (later described), iq*=0, vd_0*=Pb*1/X, and vq_0*=0.

Here, normally, letting vq_0*=0, because it is not possible to have iq* with torque command Te* and motor rotation speed ω, in this embodiment, in order to simplify the calculations, normally let vq_0*=0. When the motor is rotating, because it is possible to have iq* flowing, it is possible to establish a corresponding vq_0*. Furthermore, in this embodiment, in the maps except for Pb*=0, there is input several values which result from the distributed power target value rto_pa=1. In other words, when Pb* is 0 or more, in the relationship of the later described rto_pa and rto_pb it is necessary to assume rto_pa=1.

Figure 19:
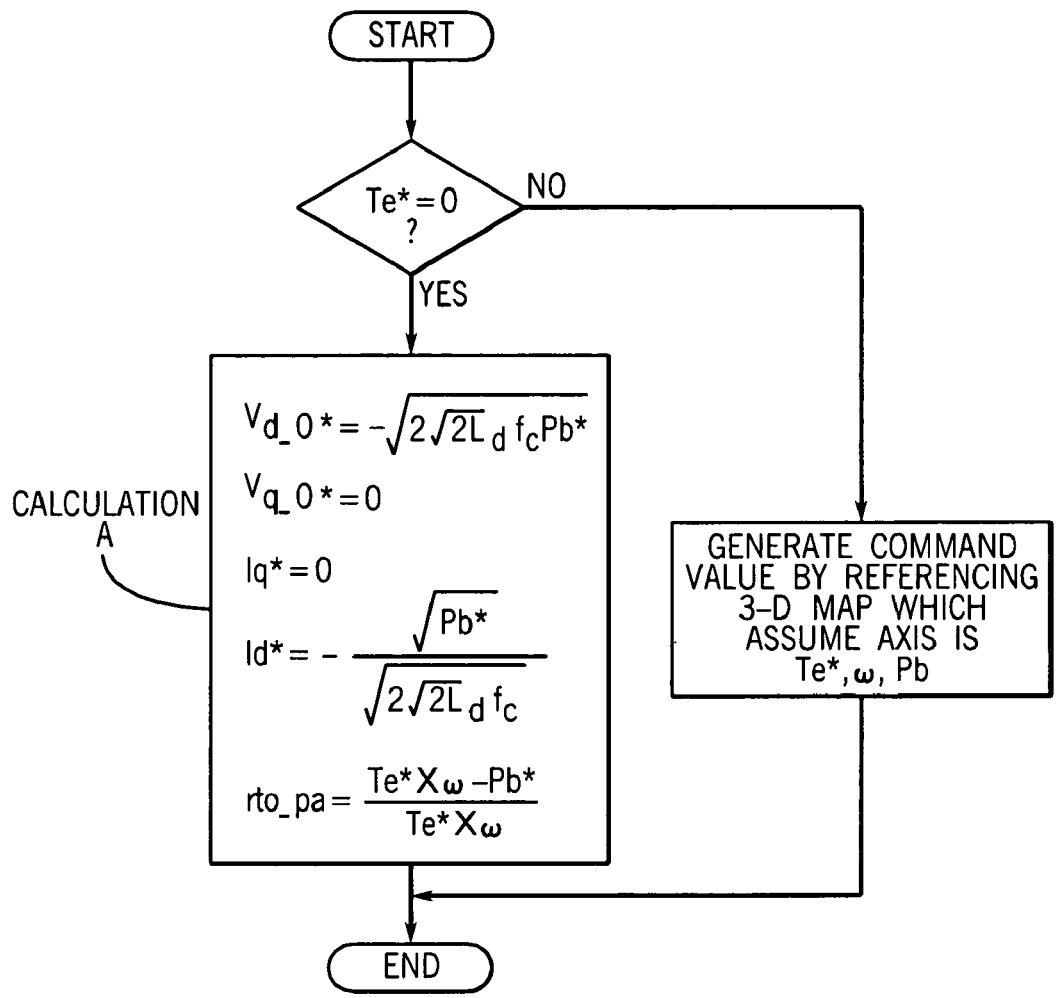
FIG. 19 is a flowchart which shows the control processing which used the 3-D maps.

FIG. 19 is a flowchart which shows the processing of the torque controller 41. As shown in this flow chart, by referencing the 3-D map, according to the state of the torque command, it becomes possible to omit the calculation A. The torque command torque controller 41 generates id*, iq*, rto_pa, vq_0*, and vd_0* following the flowchart shown in FIG. 19. As shown in the figure, there is determination of the inputted torque value as 0 or not 0, and when the toque command is 0, calculation A is performed. In this calculation, with the motor in a condition of 0 torque, there is a command value calculation in order to perform at high efficiency power distribution of the source a and source b, and command values are generated so as to minimize the copper loss of the motor.

In addition, when the carrier frequency value fc is constant, there is formed beforehand, based on calculation 1, a 2-D map with the axes Pb* and Ld, and by referencing this 2-D map command values may be generated. Furthermore, when Id is constant or when its changes are small, let Ld be constant, so that the command values may be generated only with Pb* as variable. When the torque is not 0, reference the 3-D maps obtained beforehand by experiment as described previously, and form the command values which correspond to the motor's motion state.

42 is a power controller, and from the d axis current command value id*, q axis current command value iq* and d axis current value id, and q axis current value iq, and along with current control in order to match these values, and using the distributed target values of the power (rto_pa and rto_pb) which are supplied from the power sources 10a and 10b, power control is performed. The distributed target values (rto_pa, tro_pb) of the power that is supplied from the sources 10a and 10b are further supplied from a higher controller, and are determined by considering the fuel expenditure and load of the entire system.

The power distribution target value, when the compensating voltage values vd_0* and vq_0* are zero, has the meaning of the power ratio of the power source 10a and power source 10b, and in the distributed target values of the power rto_pa and rto_pb have the following relationship.

rto_pa+tro_pb=1

If one of the power distribution target values is obtained, from the above relationship it is possible to obtain the other power distribution target value. In other words, if only rto_pa is obtained from the higher level controller, calculation of the distributed voltage command is possible, Moreover, when Pb*=0, rto_pa follows which is transmitted from the higher level controller. On the other hand, when Pb* is not 0, tro_pa=1 follows which is transmitted from the control torque controller 41. In other words, with the current and power controller 42, calculation is possible of distributed voltage commands following rto_pa which is transmitted from the upper level controller or the torque controller 41.

Figure 10:
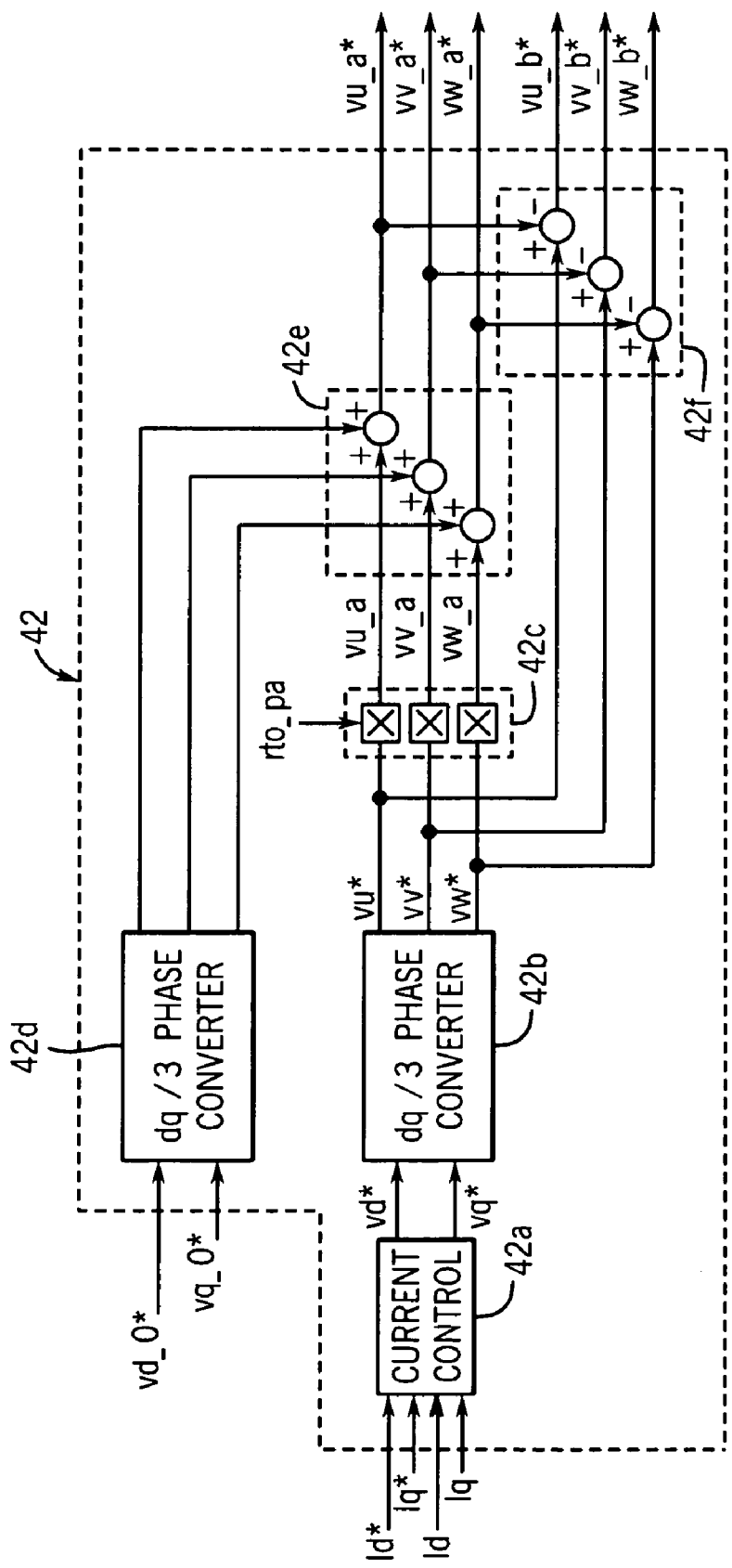
FIG. 10 is a detailed block diagram of the current-power control in the first exemplary embodiment.

There is an explanation using FIG. 10 for the details of this current power controller 42. With the current control device 42a, with id and iq complying with id* and iq*, there is performed feedback control by respective PI control, and there is output of the d axis voltage command value vd* and q axis voltage command value vq*.id and iq are obtained from the U phase current iu and the V phase current iv by the 3 phase/dq converter 48. The dq/3 phase convert device 42b is a dq/3 phase voltage converter which converts the dq axis voltage for the 3 phase voltage command, and assuming the input are the values dq axis voltage command values vd* and vq*, there is output of the u phase voltage command value vu*, the V phase voltage command value vv*, and the W phase voltage command value vw*. The multiplier 42c, a distributed voltage command value generator, respectively multiplies rto_pa by vu*, vv*, and vw*, and calculates vu_a, vv_a, and vw_a which are the voltage command values of the power source 10a (Below, record as power source 10a's voltage commands, the commands of voltage which generate from the power source 10a and record power source 10b's voltage commands, the commands of voltage which generate from the power source 10b)

vu_a=vu*·rto_pa vv_a=vv*·rto_pa vw_a=vw*·rto_pa

In addition, vd_0* and vq_0* are converted into the U phase compensating voltage value vu_0*, V phase compensating voltage value vv_0*, and W phase compensating value vw_0* by the dq/3 phase converter 42d. There is calculation of every respective phase of the obtained vu_0*, vv_0*, vw_0* and vu_a, vv_a, and vw_a, and there is output the voltage command values of the power source 10a, vu_a*, vv_a*, and vw_a* using the adder 42e, a voltage command value compensator.

vu_a*=vu_a+vu_0* vv_a*=vv_a+vv_0* vw_a*=vw_a+vw_0*

On the other hand, the voltage command values of the power source 10b, from the voltage command values which were obtained from the control voltage of the motor current control, vu*, vv*, and vw*, by subtracting the voltage command values of the power source 10a vu_a*, vv_a*, and vw_a* using the subtractor 42f.

$$vu\_b^* = vu^* - vu\_a^*$$

$$vv\_b^* = vv^* - vv\_a^*$$

$$vw\_b^* = vw^* - vw\_a^*$$

Returning to FIG. 1, the symbol 45 denotes the modulation factor in calculator which forms the instantaneous modulation rate commands mu_a*, mu_b*, mv_a*, mv_b*, mw_a*, and mw_b which are the voltage commands which are properly standardized by input of the voltage Vdc_a of the power source 10a and the voltage Vdc_b of the power source 10b. 46 denotes the modulation factor compensator which forms the final instantaneous modulation factor commands mu_a_c*, mu_b_c*, mv_a_c*, mv_b_c*, mw_a_c*, and mw_b_c* by the free processing PWM for the instantaneous modulation factor commands. 47 denotes a PWM which generates a PWM pulse which switches ON/OFF every switch of the power converter 30 according to the file instantaneous modulation factor commands. Below, there is a detailed explanation using FIGS. 3~9 of the modulation factor calculator 45, the modulation factor compensator 46, and the PWM pulse generator 47.

Figure 3:
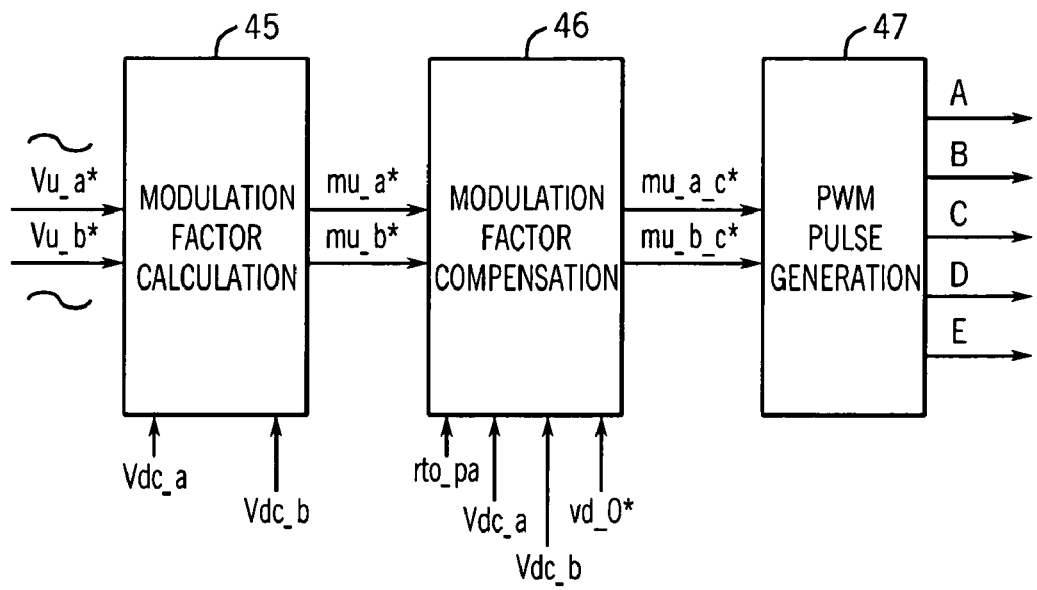
FIG. 3 is a diagram which shows the structure after cutting away one block of FIG. 2.
Figure 4:
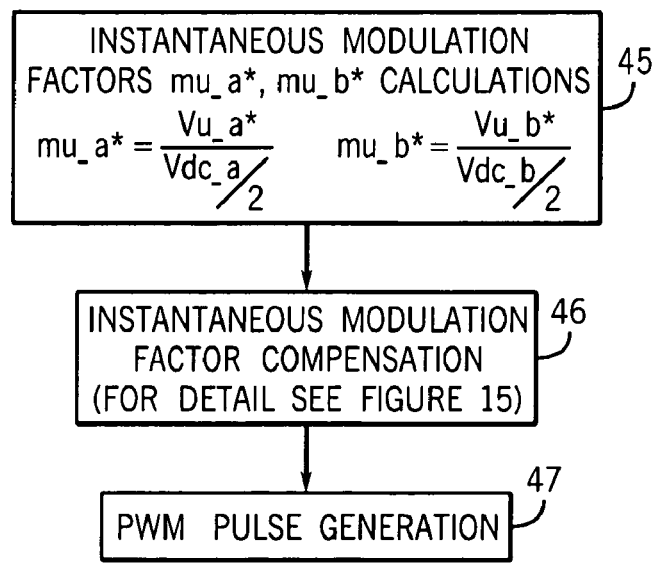
FIG. 4 is a diagram which shows the calculation of every block of FIG. 4.

FIG. 3 is a diagram which shows the cut structure of one part of a block of FIG. 1, FIG. 4 shows, using a flowchart, the calculation which is performed by every means of FIG. 3. The following explanation discusses the execution of exactly the same operation for V phase and W phase as was performed only for U phase.

The modulation factor calculator 45 performs calculation 2 which is shown in FIG. 4. By normalizing, using half the value of their respective direct current voltages, the U phase power source 10a portion voltage command vu_a* and power source 10b portion voltage command vu_b*, there is obtained the power source 10a portion instantaneous modulation factor command mu_a* and power source 10b instantaneous modulation factor command mu_b*.

$$mu\_a^* = vu\_a^*/(Vdc\_a/2)$$

$$mu\_b^* = vu\_b^*/(Vdc\_b/2)$$

The modulation factor compensator 46 performs the calculation 3 is shown in FIG. 4. Because this calculation outputs the obtained modulation factor, there is distribution of the duration of the PWM period. First, there is calculation of the following ma_offset0 and mb_offset0 from the power source voltages Vdc_a and Vdc_b. Here, rto_pb is calculated according to the previous equation.

$$rto\_pb = 1 - rto\_pa$$

$$ma\_offset0 = \frac{\left|\frac{rto\_pa}{Vdc\_a}\right|}{\left|\frac{rto\_pa}{Vdc\_a}\right| + \left|\frac{rto\_pb}{Vdc\_b}\right|}$$

$$mb\_offset0 = \frac{\left|\frac{rto\_pb}{Vdc\_b}\right|}{\left|\frac{rto\_pa}{Vdc\_a}\right| + \left|\frac{rto\_pb}{Vdc\_b}\right|}$$

Figure 14:
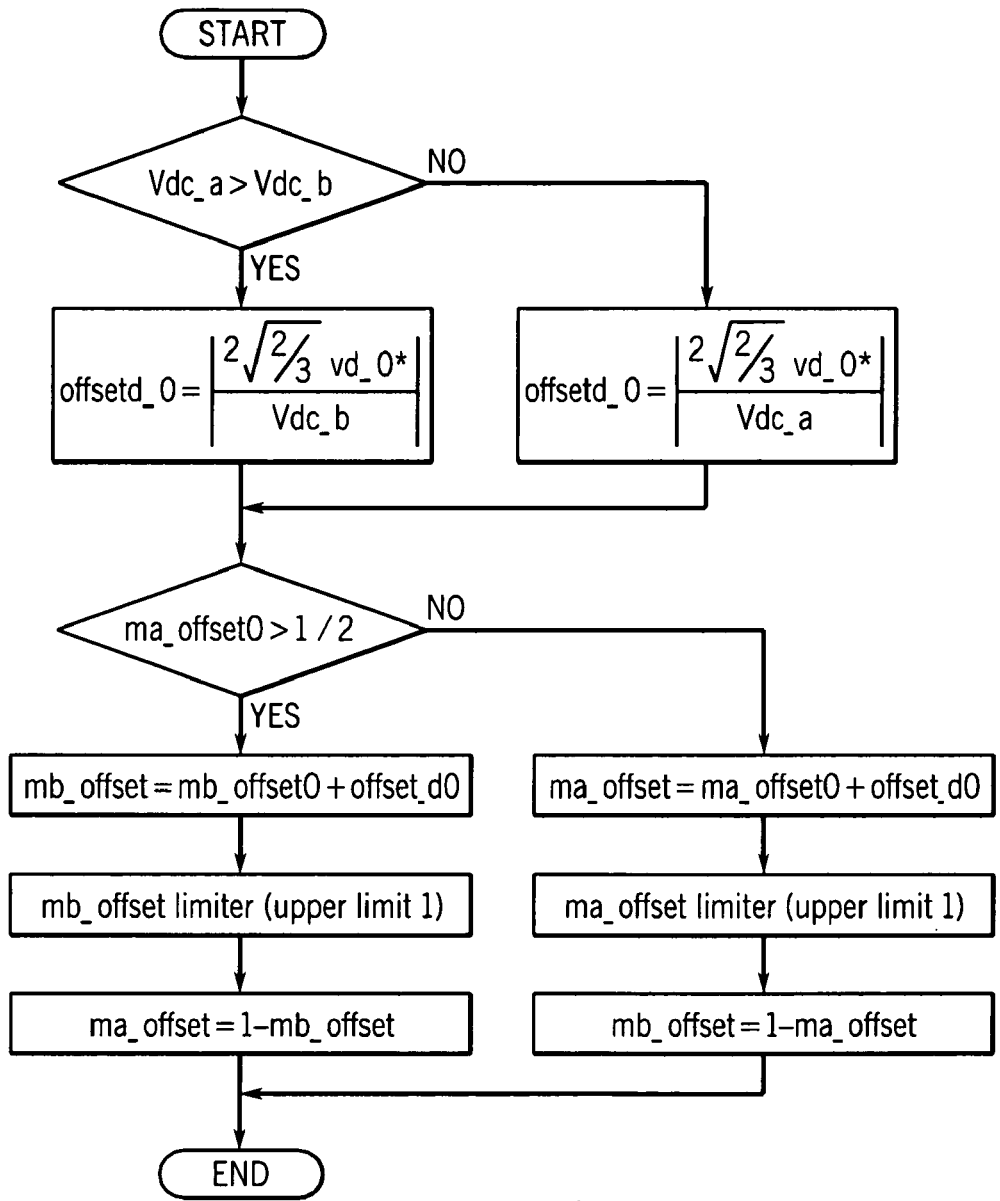
FIG. 14 is a detail flowchart of the modulation factor compensation of the first exemplary embodiment.

Next, following a flowchart and of FIG. 14, and there is a comparison of the magnitude of the source voltage Vdc_a and Vdc_b. After comparison, there is calculation of a modulation factor amplitude offset_d0. At this time, with a small voltage source the offset _d0 becomes large, and because there is maintenance of this modulation factor amplitude, the first there's a comparison of the magnitudes of the source voltages. In addition, in this Embodiment, vq_0*=0 is assumed, and because there is output of vd_0* as the offset_d0, there is obtained the necessary modulation factor amplitude.

When Vdc_a < Vdc_b, $$offsetd\_0 = \left|\frac{2\sqrt{2/3}\, vd\_0^*}{Vdc\_a}\right|$$

and when Vdc_a > Vdc_b, $$offsetd\_0 = \left|\frac{2\sqrt{2/3}\, vd\_0^*}{Vdc\_b}\right|$$

After calculating the offset_d0, there's a comparison of the amplitude of the most recent calculated ma_offset0 and mb_offset0, and there is calculation of the offset_d0 as small, and there is retention of the offset value so as to be able to output the modulation factor amplitude. Here, the falling relationship holds for the ma_offset0 and mb_offset0.

$$ma\_offset0 + mb\_offset0 = 1$$

Accordingly, ma_offset0>mb_offset0 can be shown in the following way.

$$ma\_offset0 > \frac{1}{2}$$

If this condition is true, mb_offset0 is small, and there is calculation of offset_d0 by mb_offset0.

$$mb\_offset = mb\_offset0 + offset\_d0$$

In addition, assuming the upper limit of mb_offset is 1, by passing through a limiter which contains this upper limit value, there is obtained the limiter output mb_offset*. The ma_offset* is calculated from the following equation.

$$mb\_offset^* = 1 - mb\_offset^*$$

When there exists a result which does not satisfy the branch condition (False), as shown in the flowchart, there is execution of the calculation by interchanging a and b.

For the source 10a portion instantaneous modulation factor indication mn_a* and the source 10b portion instantaneous modulation factor indication mu_b*, there is executed a compensating calculation as follows by using the offset values ma_offset* and mb_offset* to give outputs of mu_a_c* and mu_b_c*.

$$mu\_a\_c^* = mu\_a^* + ma\_offset^* - 1$$

$$mu\_b\_c^* = mu\_b^* + mb\_offset^* - 1$$

Figure 15:
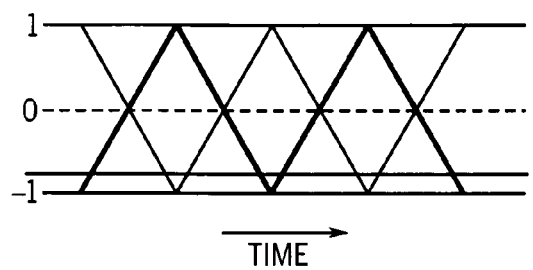
FIG. 15 is a diagram which shows the relationship of the compensating modulation factor, the modulation factor, and the triangular wave for the first exemplary embodiment.

By performing the compensating calculations in this way, it is possible to maintain the time which can output the modulation factor command when doing triangular wave comparison. For example, when rto_pa=1, mb_offset0 becomes 0, and offset_d0 is calculated as mb_offset, and the time can be maintained for outputting the d axis positive voltage. FIG. 15 shows mu_b_c* and mb_offset at this time, and by calculating mb_offset for mu_b*, it is understood that it is possible to realize a triangular wave comparator.

Figure 5:
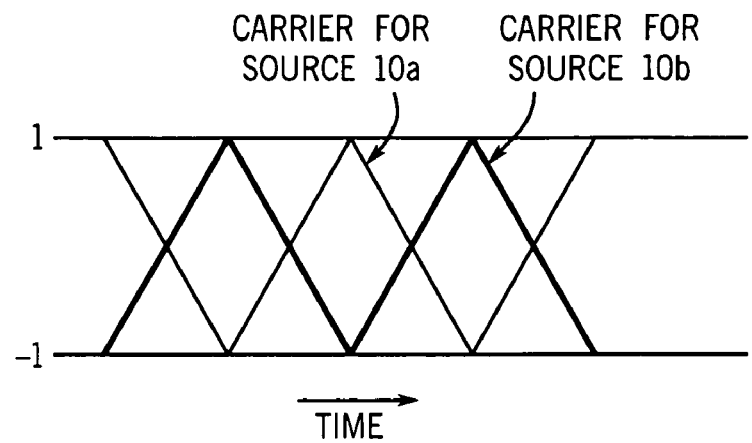
FIG. 5 is a view which shows the triangular wave which is used by the PWM pulse generation method of the first exemplary embodiment.
Figure 6:
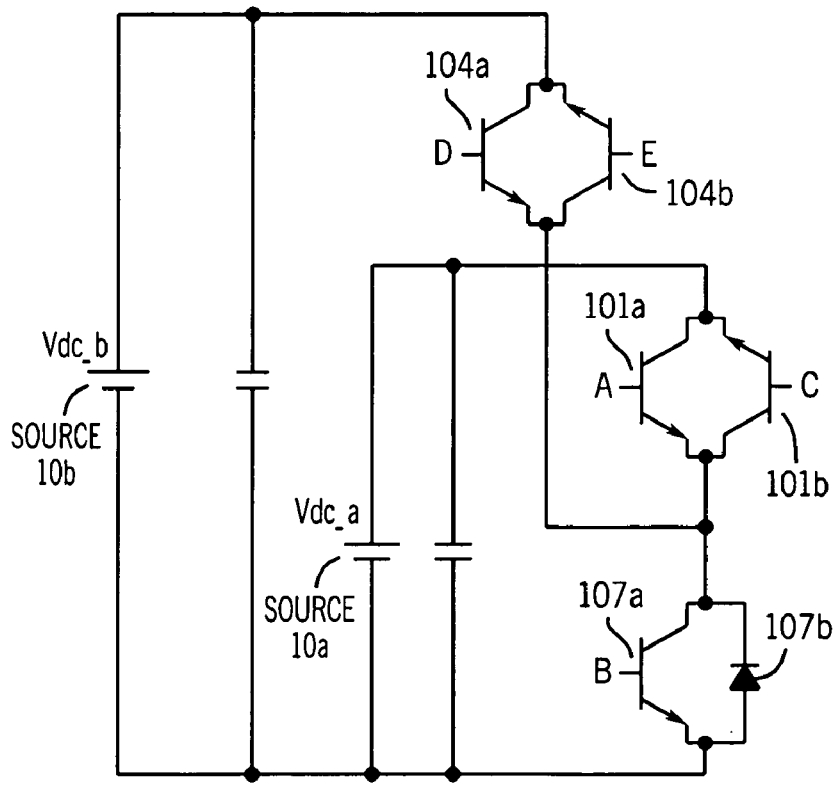
FIG. 6 is a diagram which shows the structure a U phase that has been removed from FIG. 2.

The PWM pulse generator 47 performs processing of the calculator 4 which is shown in FIG. 4. In FIG. 5, the carrier that is used for the source 10a outputs a voltage pulse from the voltage Vdc_a of the source 10a, there is a triangular wave carrier for generating the PWM pulse which tries every switch, and in the same way, there is established a triangular wave as a carrier for the use of source 10b. These triangular wave carriers take the values of upper limit +1 and lower limit 1, and have a phase difference of 180°. Here, based on FIG. 6 there are the signals which drive every switch of the U phase as follows:

A: driving signal of the switch which conducts towards the output terminal from the source 10a B: driving signal of the switch which conducts towards the negative electrode from the output terminal C: driving signal the switch which conducts towards the source 10a from the output terminal D: driving signal of the switch which conducts towards the output terminal from the source 10b E: driving signal of the switch which conducts towards the source 10b from the output terminal First, there is a description of the pulse generating method when outputting the voltage pulse from the source 10a. What outputting the PWM pulse from the source 10a, it is necessary to make A ON. There is a voltage difference between the positive electrode and the positive electrode, and when Vdc_a>Vdc_b, and when A and E are made ON, there which short-circuits between the positive electrodes. For example, when at the same time when A goes from ON to OFF and E goes from OFF to ON, because time is required until A is completely OFF, and added to the E ON time, time is generated for making both ON, a short circuit flows, and there's an increase in the generated heat of the semiconductor switch which is established on this path. In order to prevent an increase in this kind of heat, after time has elapsed during which the driving signals A and E are both made OFF, A and E are both made ON from OFF. There is executed post generation that adds a short-circuit prevention period (dead time) in this way to the driving signal. In the same way that there was added dead time to the driving signals of A and E, there is added dead time to E and C, and furthermore, because a short-circuit is prevented between the negative electrode and the positive electrode, there is added dead time to A and B and E and B.

Figure 7:
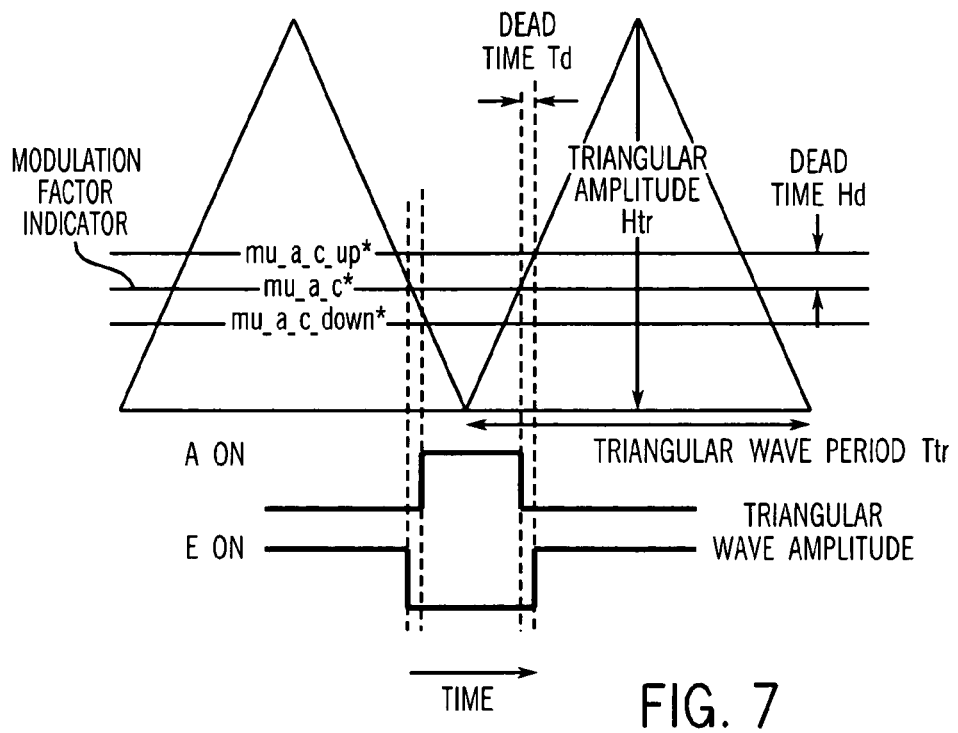
FIG. 7 is a diagram which shows the pulse generation of A and E by the triangular wave comparator.

Using FIG. 7, there is an explanation below of the method of adding dead time to the driving signals of A and E. In order to perform driving signal generation which adds dead time, there is obtained in the following way mu_a_c_up* and mu_a_c_down* which were offset from mu_a_c*.

$$mu\_a\_c\_up* = mu\_a\_c* + Hd$$

$$mu\_a\_c\_down* = mu\_a\_c* - Hd$$

Here, Hd is the triangular wave amplitude (from the base to the peak) which is obtained from Htr and period Ttr, and dead time Td in the following way.

$$Hd = 2Td \times Htr/Ttr$$

Performing a comparison of the carrier and mu_a-c*, mu_a_c_up*, and mu_a_c_down*, there is obtained the driving signals of the switches A and E according to the following rules.

| | | |
|---|---|---|
| If | mu_a_c_down* >= carrier for source 10a | A = ON |
| If | mu_a_c* <= carrier for source 10a | A = OFF |
| If | mu_a_c* > = carrier for source 10a | E = OFF |
| If | mu_a_c_up* <= carrier for source 10a | E = ON |

In this way, by the generation of the driving signal, it is possible to establish between A and E the dead time of Td, it is possible to prevent a short-circuit between the positive electrodes.

Figure 8:
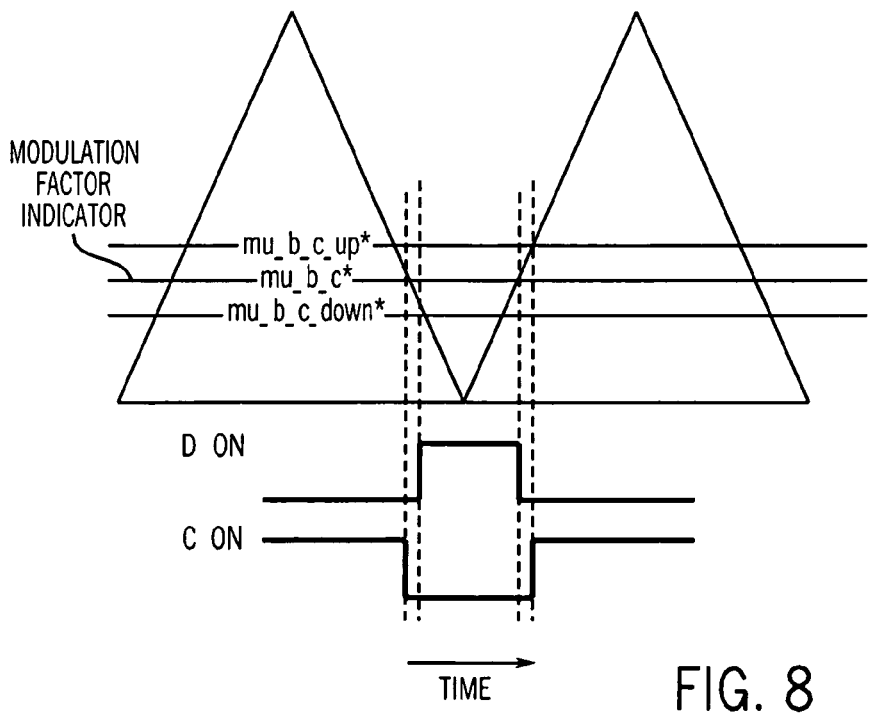
FIG. 8 is a diagram which shows the pulse generation of D and C by the triangular wave comparator.

In addition, the pulse generation method when outputting the voltage pulse from the source 10b, is done in the same way as with the source 10a, and there is obtained the following mu_b_c_up*, mu_b_c_down*, and there is performed a comparison with the carrier which is used for source 10b (FIG. 8).

$$mu\_b\_c\_up* = mu\_b\_c* + Hd$$

$$mu\_b\_c\_down* = mu\_b\_c* - Hd$$

There is obtained the driving signals of the switches of D and C using the following rules.

| | | |
|---|---|---|
| If | mu_b_c_down* >= carrier for source 10b | D = ON |
| If | mu_b_c* <= carrier for source 10b | D = OFF |
| If | mu_b_c* > = carrier for source 10b | C = OFF |
| If | mu_b_c_up* <= carrier for source 10b | C = ON |

In this way, is possible to establish dead time of Td between D and C, and is possible to prevent a short-circuit between the positive electrodes. The driving signal B is formed from the AND of the generated driving signals E and C.

$$B = E \times C$$

Figure 9:
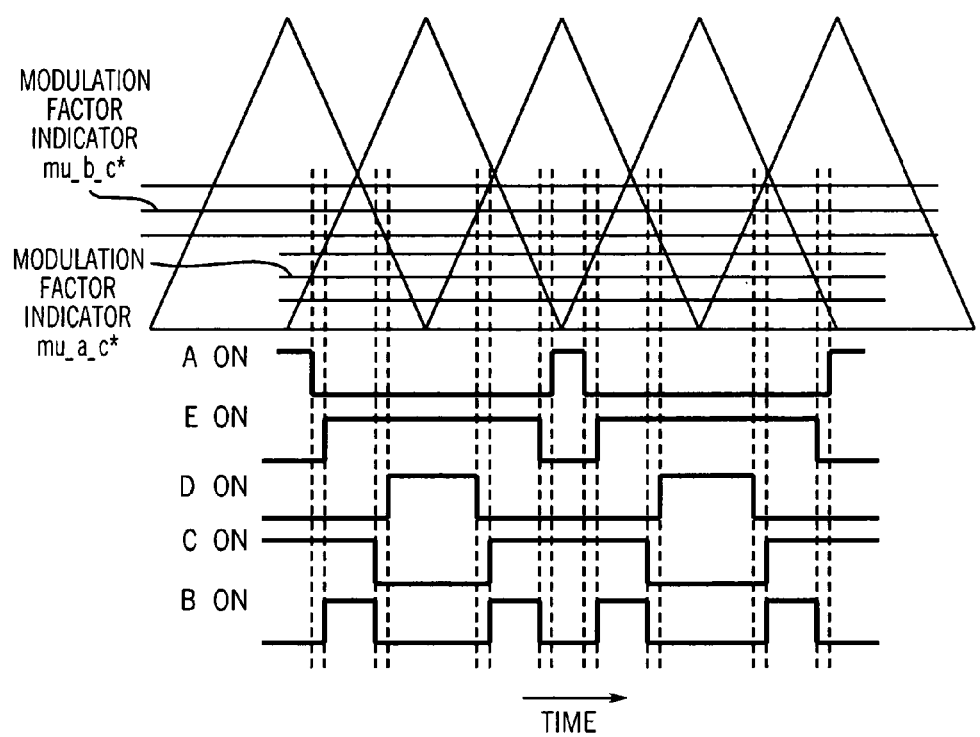
FIG. 9 is a diagram which shows an example of pulse generation for which dead time was added.

E is the driving signal to which is attached dead time with A, and C is the driving signal to which is attached dead time with D. Because of this, by generating B from the AND of E and C, it is possible to generate dead time for both B and A and B and E. FIG. 9 shows an example of post generation to which dead time is added. According to the PWM pulse that was generated in this way, there is ON/OFF driving of every switch of the power converter and generation of the output voltage pulse. When taking an average of the voltage pulse that was generated from the voltage Vdc_a of the source 10a and the voltage pulse that was generated from the voltage Vdc_b of the source 10b there is generated a voltage pulse which realizes the original three-phase voltage command values vu*, vv*, and vw*.

The power Pe (effective power) of the alternating current motor is shown in the following way if using the dq axis' voltage vd, vq and current id, iq.

$$Pe = vd \times id + vq \times iq$$

As understood from this equation, for id, iq=0, power is 0, and in addition, even if id or iq is not 0, when the voltage of the same axis is 0, the power is 0. In addition even if not 0, when one of the values from the product is small, if the powers calculated a small result occurs. By using the distributed target value for the power, it is possible to distribute the power of source 10a and source 10b but when the motor power for conventional electrical power converters is 0, or extremely small, it is difficult to move power from source 10a to source 10b.

By using the current command value in the compensating voltage value which were output by the torque controller according to this aspect of the invention, there is executed the following operation as an example. The motor torque command value 0 is input to the torque controller, and according to id*=0, iq*=0 as the motor current command values, even when it becomes possible to realize this torque command value 0, if Pb* is input to the torque controller, by referencing the command value map which corresponds to this, 0 is output for iq* which is the torque part current and output of current command value id* and compensating voltage value vd_0* (vq_0*=0), and the power distribution ratio outputs the power distribution ratio rto_pa=1 (rto_pb=0). At this time, when Pb* has a negative value, that is, when there is a power command which shows charging, their supply of charging power of the source 10b from the source 10a. Because there is power distribution ratio rto_pa=1, rto_pb=0, the source 10a calculates vd_0* and outputs to vd*, and the other source 10b outputs –vd_0*, and there is represented by using power Pa of the source 10a and Pb of the source 10b, and the voltage and current command values, the following holds.

$$Pa=(vd^*+vd\_0^*)\cdot id^*+vq^*\cdot iq^*$$

$$Pb=-vd\_0^*\cdot id^*$$

As shown by these equations, if vd_0* and id* are the same symbols, the source 10a outputs a large power compared to the motor power by vd_0*, and there's charging of the source 10b. As in the above way, even when the torque command value for the motor is 0, there is output of the current command value in the compensating voltage command value by the torque command controller, and based on this, according to the generation of the voltage pulse, it becomes possible to move power to other sources. In addition, even for the motor speed 0, it is possible to move power the same way.

Figure 16A:
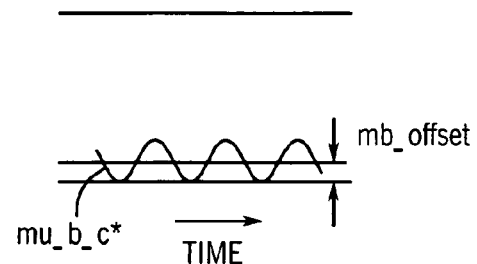
FIG. 16 is a diagram which shows the source power in the pattern experiments using an embodiment.
Figure 16B:
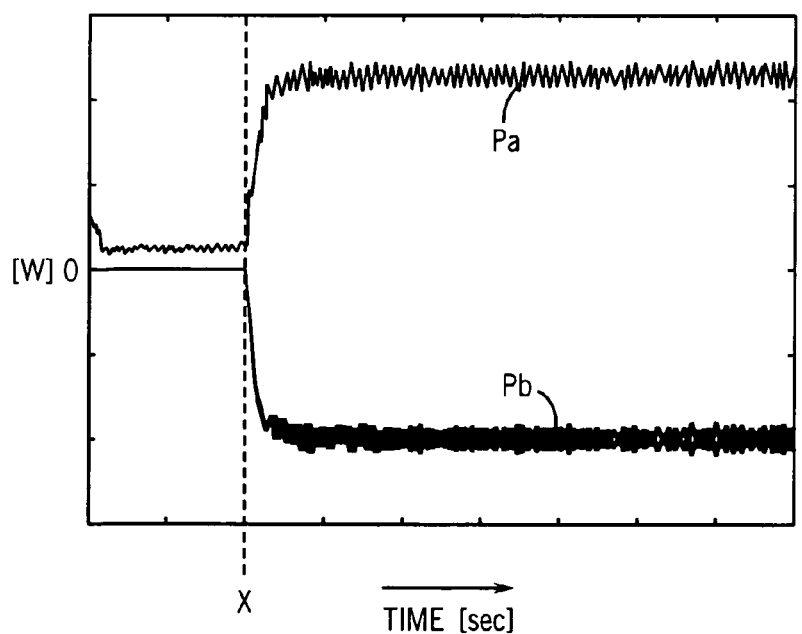
Figure 17:
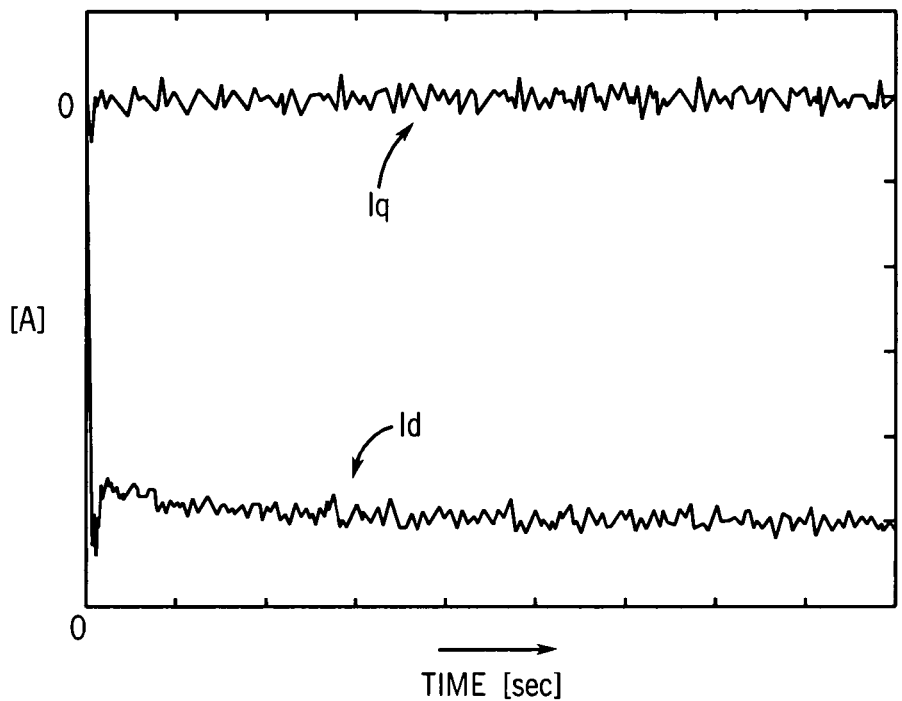
FIG. 17 is a diagram which shows the motor d q axis current in the pattern experiments using an embodiment.

FIGS. 16 and 17 show the results of this example, according to actual experiments. FIG. 17 shows the motor currents id, iq, and if iq is controlled to 0, the motor torque becomes 0. In addition, FIG. 16 shows each source's power Pa and Pb, and before the instant X, the source power command value Pb* 0 is input to the torque controller; in the compensating voltage command value 0 is output. From the instant C, negative power command value is input to the torque controller, and the torque controller outputs the compensating voltage command value vd_0*, and from these results, it is understood it is possible to realize power movement among the sources. In addition, because there is obtained the voltage command value by calculating the above mentioned distributed voltage command value for the compensating voltage command value, it is possible to arrive at power movement using good waveform for which the changes that are shown in FIG. 16 are comparatively small.

In addition, if a fuel cell and battery are appropriately used for the source with this invention in hybrid electric automobiles, without using the power converter of a direct current power such as in DC/DC converters, because it is possible that there is battery charging by means of the power converter and motor, and electrical system for automobile driving can have a simple structure, small size and light weight. Moreover, there is output of the compensating voltage command value as d voltage, and when iq* is not 0, using the q axis voltage for the compensating voltage command value, it becomes possible to realize movement of power as described above.

Next, there is shown a determination method for id when the motor torque is 0. Under these conditions, there is an explanation of the control of the torque controller 41. The torque controller 41 is a block which generates optimal current command values and compensating voltage command values from the torque command value Te*, rotation count ω, power command value Pb* of source b. This control has command value generation methods for effective charging, when the torque is 0, from source 10a to source 10b or from source 10b to source 10a.

In order to have good effective charging, first, indicate a calculation method for the motor's loss. The motor's loss can be categorized according to the iron loss (excitation loss) Wi, copper loss (electric power loss) Wc, and the mechanical loss Wm. Among these the copper loss is obtained from $$Wc=R^*\sqrt{(id^2+iq^2)} \quad (1).$$

Especially, when the torque is 0, because iq is assumed to be 0 which must make the torque in the q axis direction of the motor 0 (magnetic torque), the copper loss becomes $$Wc=R^*\sqrt{id^2} \quad (2).$$

In addition, when the ripple component idh (actual value) is raised to id, this loss becomes $$Wc=R^*id^2+R^*idh^2 \quad (3).$$

Here, the voltage and current of the permanent magnet synchronous electrical motor have the following relationship.

$$vd=(R+pLd)id-Lq^*\omega e^*iq \quad (4)$$

$$vq=(R+pLq)iq+Ld^*\omega e^*id+\omega e^*\phi \quad (5)$$

The symbols vd, vq are the d axis q axis voltages of the motor 20, p is the differential operator, ωe is the electrical angle frequency, φ is the electrical flux linkage. Here, under stationary conditions, iq=0, and assuming Rid is zero if small compared to pLd, $$vd=pLdid \quad (6)$$

$$vq=Ld^*\omega e^*id+\omega e^*\phi \quad (7).$$

Figure 21:
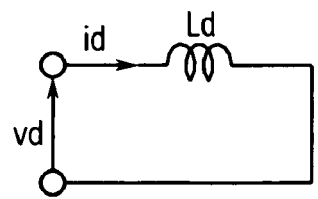
FIG. 21 is a diagram which shows an equivalent circuit of the d axis.

Consequently, the equivalence circuit for the d axis becomes as shown in FIG. 21. Here, in this construction, there results the command values $$vd\_a^*=vd\_a+vd\_0^* \quad (8)$$

$$vd\_b^*=vd^*-vd\_a^* \quad (9)$$

Figure 22:
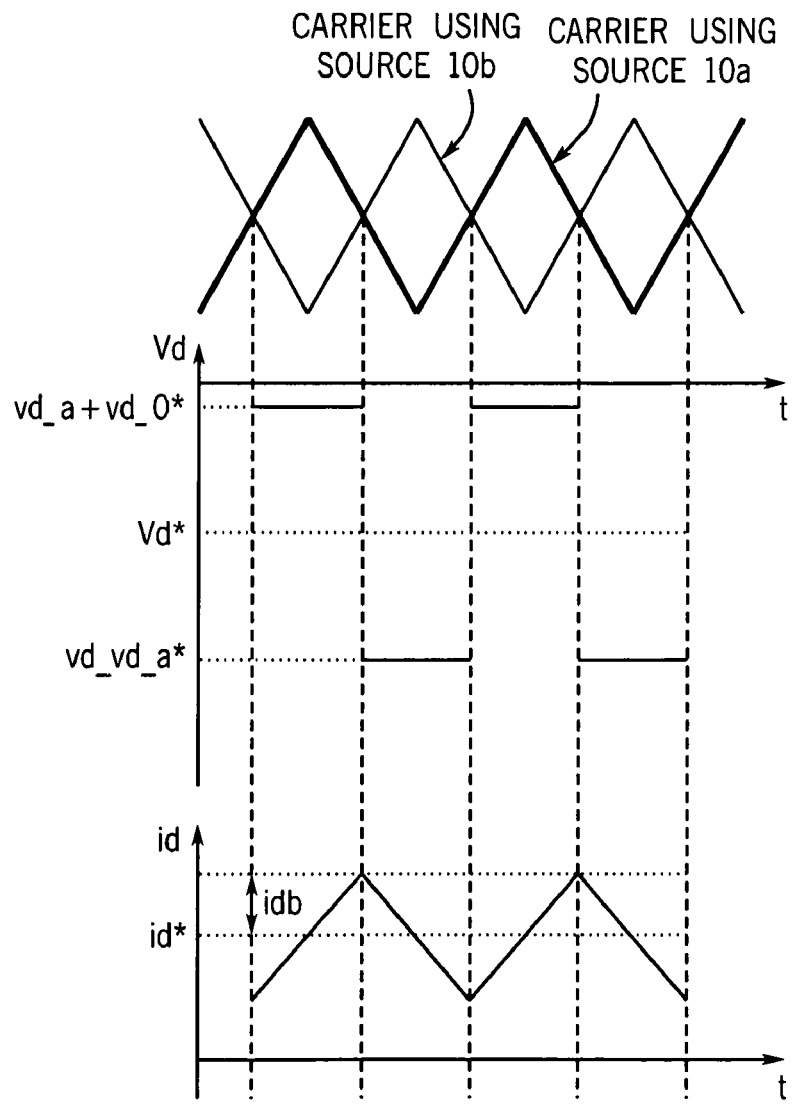
FIG. 22 is a timing chart of the carrier and voltage-power.

By vd taking the 2 values which are shown in FIG. 22 (timing chart of the carrier and voltage-power), when impressing these two values of vd on the equivalent circuit of FIG. 21, id has a ripple component. This value is obtained by equation (10).

$$idh = \frac{Vd\_0}{2\sqrt{2Ld\,fc}} \quad (10)$$

Consequently, the copper loss from equation (3) is $$Wc = R\left(id^2 + \frac{Vd\_0^2}{8Ld^2 fc^2}\right) \quad (11)$$

Even when there is a change in the carrier frequency or motor inductance with this structure, it is possible to calculate accurately the copper loss, and it is possible to optimize the loss with good precision.

Figure 23:
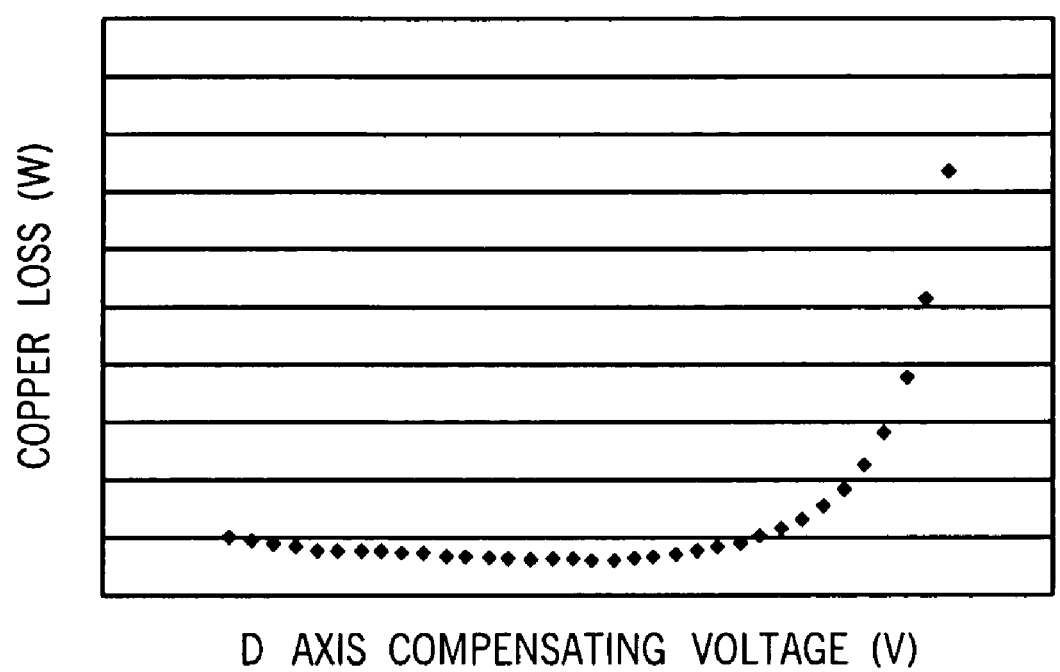
FIG. 23 is a diagram which shows the relationship between copper loss and voltage.

Next, there is a discussion of the method for generating command values based on equation (11). When the copper loss is calculated, from equation (11), using the compensating voltage command value as the horizontal axis, the copper loss changes as shown in FIG. 23 (the figure shows the relationship between the copper loss and the voltage). This waveform has a convex waveform. Here, by obtaining the minimum point of the rate of change of the copper loss with respect to the rate of change of the compensating voltage command value, there is determination of the compensating voltage command value which makes the copper loss a minimum.

At the point where the copper loss is minimized, if the expression within the parentheses of equation (11) is assumed to be a minimum, and substituting Vd_0*/Pb* for Id*, assuming the relationship of Vd_0*/Pb* of equation (11), and minimizing the equation, there is obtained an equation in which the differential of the equation becomes 0. This equation is given below.

$$V_{d\_o}* = -\sqrt{2\sqrt{2}L_d f_c Pb^*} \quad (12)$$

In addition, Id* from this equation is, because Pb*=Vd_0*Id*

$$Id^* = -\frac{\sqrt{Pb^*}}{\sqrt{2\sqrt{2}L_d f_c}} \quad (13)$$

From this construction, it is possible to generate a compensating voltage command value which normally minimizes the copper loss with respect to changes in the motor's inductance value, the carrier frequency value, and the source power command value.

As described above, by obtaining the command values which minimize the copper loss as in equations (12) and (13), there is minimization of the copper loss of the motor, it is possible to move very effectively. Especially, because the larger the current the greater the copper loss, and because of the significant effect with a large current region, it is possible to improve. especially the effectiveness in a large current region. Furthermore, because it is possible to generate command values online by generating the command values according to the equations, it is possible to calculate with good precision changes in the parameters by referencing command value maps which were preformed by experiment or calculation, because it is possible to reduce the calculations of the CPU within the control device, it is possible to form a control device using low-cost CPUs. In addition, by using the inductance values on the d,q axes, compared to using 3 inductance values for the 3 phases, 2 inductance values may be used, and especially when the torque is 0, because there may be used only one d axis inductance, it is possible to reduce the calculations.

Figure 20:
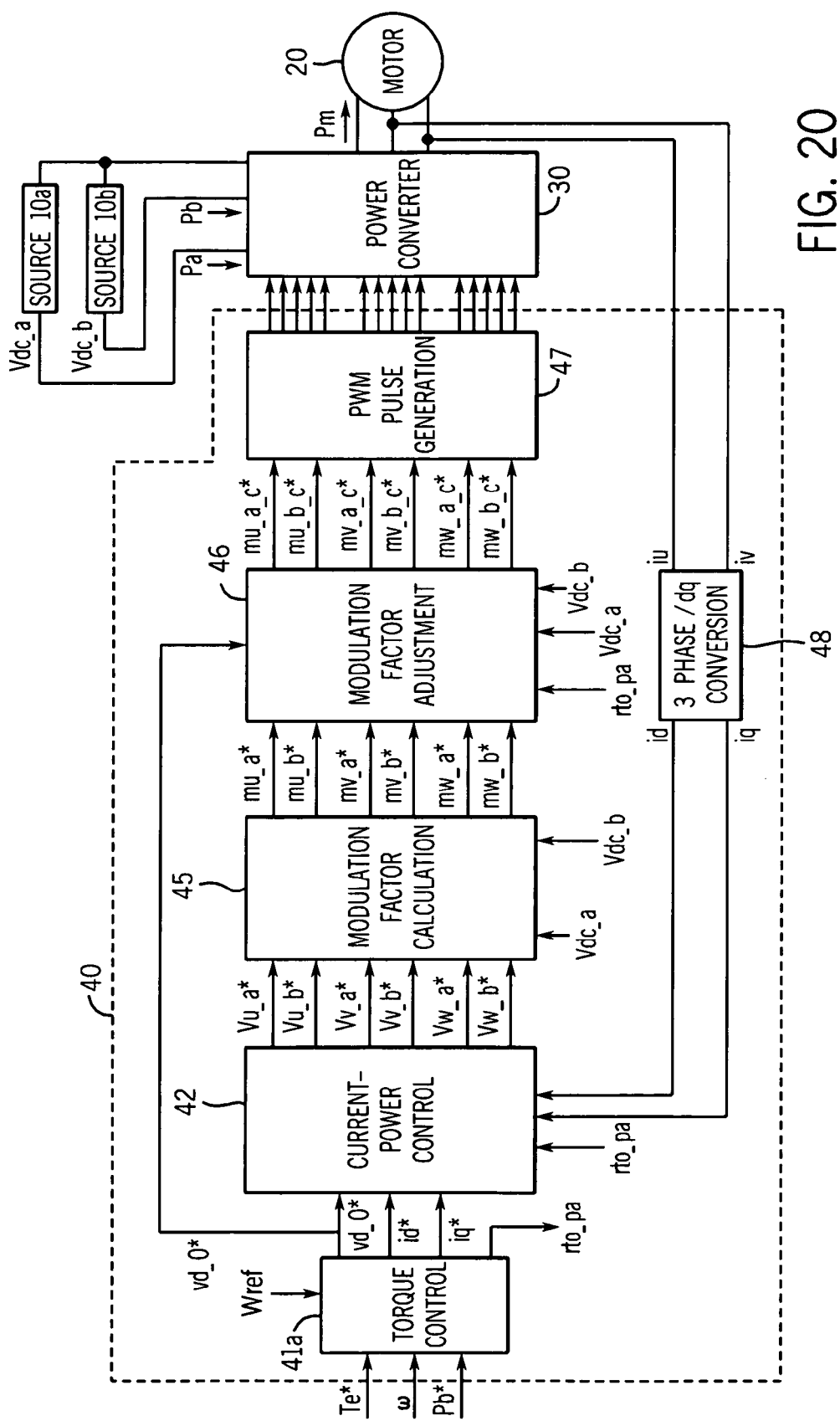
FIG. 20 is a diagram which shows the structure of the control system of a second exemplary embodiment.
Figure 24:
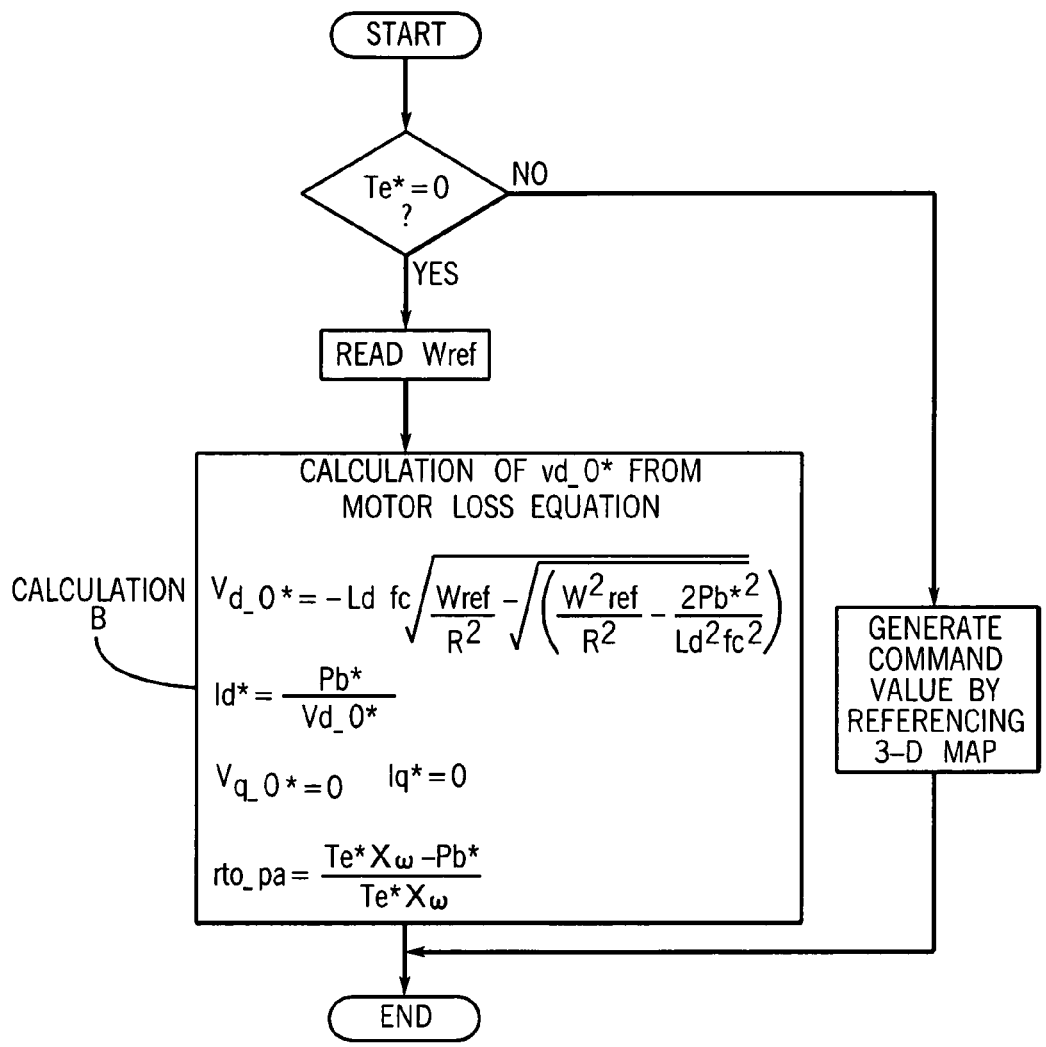
FIG. 24 is a flowchart which shows the control processing for the second exemplary embodiment.

Because the second exemplary embodiment differs from the first exemplary embodiment only in the construction of the torque controller 41, there is an explanation only of the differences by using FIG. 20 and FIG. 24. FIG. 20 shows a control structure of this embodiment, and results of the structure which inputs to the torque controller 41 of the first exemplary embodiment the motor loss command value Wref. Assume 41a as this block. 41a is the torque controller which calculates from the torque command Te* which was obtained externally, the motor rotation speed ω, the power command value Pb* of the source b, the carrier frequency value fc of the power converter 30, the inductance value Id of the motor 20, and the motor loss command value Wref, the command value id* of the d axis current of the alternating current motor, the command value iq* of the q axis current, the distributed power target value rto_pa, the d axis voltage compensating value vd_0, and the q axis voltage compensating value vq_0, and generates id*, iq*, rto_pa, vd_0*, and vq_0* so that the motor loss follows the motor loss command values.

The FIG. 24 shows the operation of the tour control torque controller 41a. There is determination of whether the torque command value is zero or not, and there is generation of the command value by calculation 2 when that value is zero. The calculation 2 is obtained from the motor loss equation (11). That is, by reverse calculating Vd_0 from the motor loss equation, their results a structure which generates a compensating voltage command value. In addition, when the torque command is not zero, there are generated command values using the 3-D maps assuming Te* ω Pb* as the axis.

By the structure of this embodiment, there are generated current command values and compensating voltage commands I use which track the motor loss with motor loss command values. Consequently, the compensating voltage command value which minimized the motor loss is not output using direct current voltage constraints, there is still good efficiency because it is possible to generate optimal compensating voltage command values by adjusting the command values.

Figure 11:
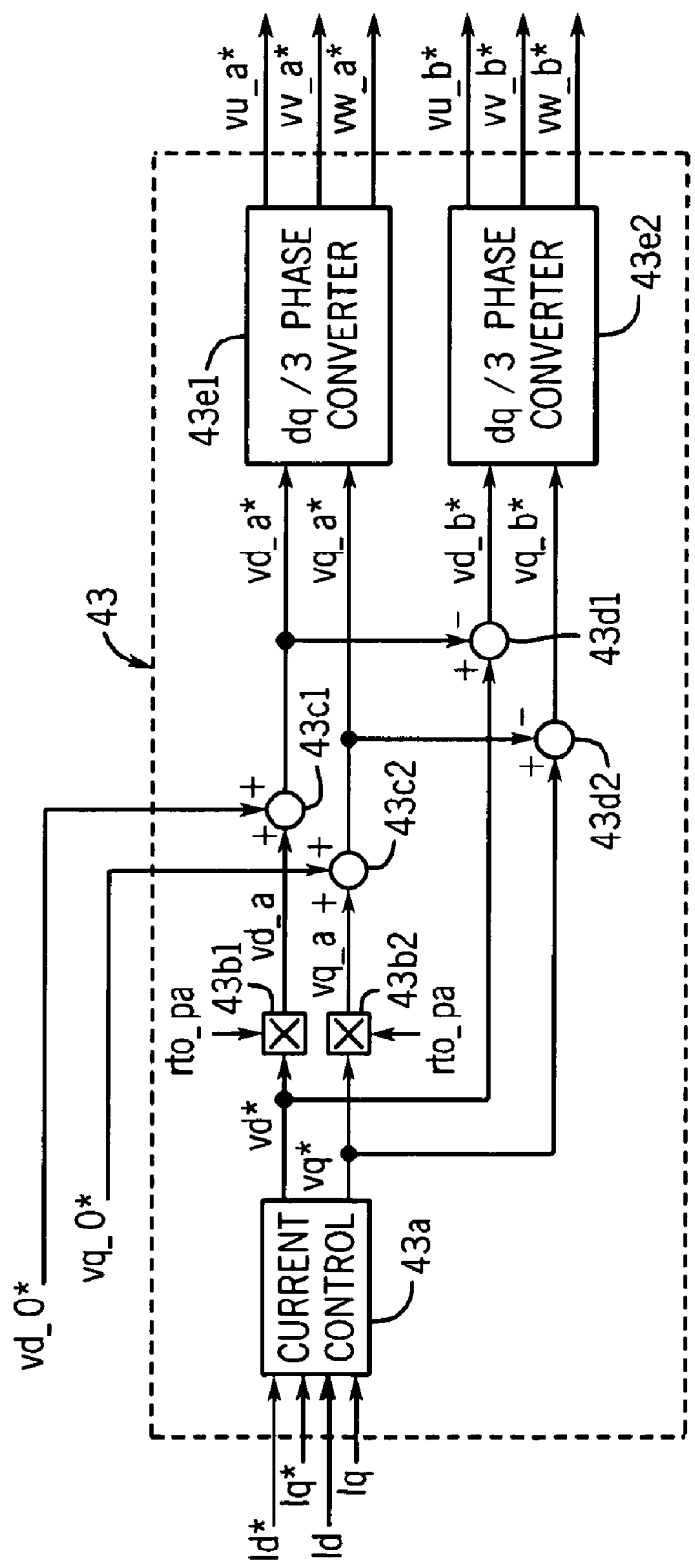
FIG. 11 is a detailed block diagram of the current-power control in a third exemplary embodiment.

The third exemplary embodiment comprises distribution the voltage and compensating value calculations using dq axis. Because the third exemplary embodiment differs from the first exemplary embodiment only in the structure for the current and power control, using FIG. 11, there is an explanation of this difference. The d axis voltage command value vd* which is the output of the current controller 43a, for the q axis voltage command value vq*, there's multiplication respectively of rto_pa using the multipliers 43b1 and 43b2, and there are calculations of vd_a and vq_a command values of the source 10a.

$$vd\_a = vd^* \cdot rto\_pa$$

$$vq\_a = vq^* \cdot rto\_pa$$

There are respective calculations for these outputs of the voltage compensating values vd_0* and vq_0* using the adders 43c1 and 43c2, and there are obtained the final values vd_a* and vq_a* which are the dq voltage command values of the source 10a.

$$vd\_a^* = vd\_a + vd\_0^*$$

$$vq\_a^* = vq\_a + vq\_0^*$$

On the other hand, the d q axis voltage command values vd_b* and vq_b* of the source 10b are obtained by respectively subtracting from the outputs vd* and vq* of 43a using the subtractors 43d1 and 43d2 the dq axis voltage command values of the source 10a.

$$vd\_b^* = vd^* - vd\_a^*$$

$$vq\_b^* = vq^* - vq\_a^*$$

The dq/3 phase converters 43e1 and 43e2 are dq/3 phase voltage converter means which convert dq axis voltage (2 phase) to 3 phase voltage commands, and convert the source 10a vd_a*, vq_a* and source 10b vd_b*, vq_b* to 3 phase voltage commands. As was described above, according to the 3 phase voltage command values, there's control of the power converter by operation from means 45. In the construction of this embodiment, compared to the first exemplary embodiment, the number of multipliers, adders, and subtractors is small, and it is possible to reduce the calculation time of the microcomputers which are used for control calculations.

Figure 12:
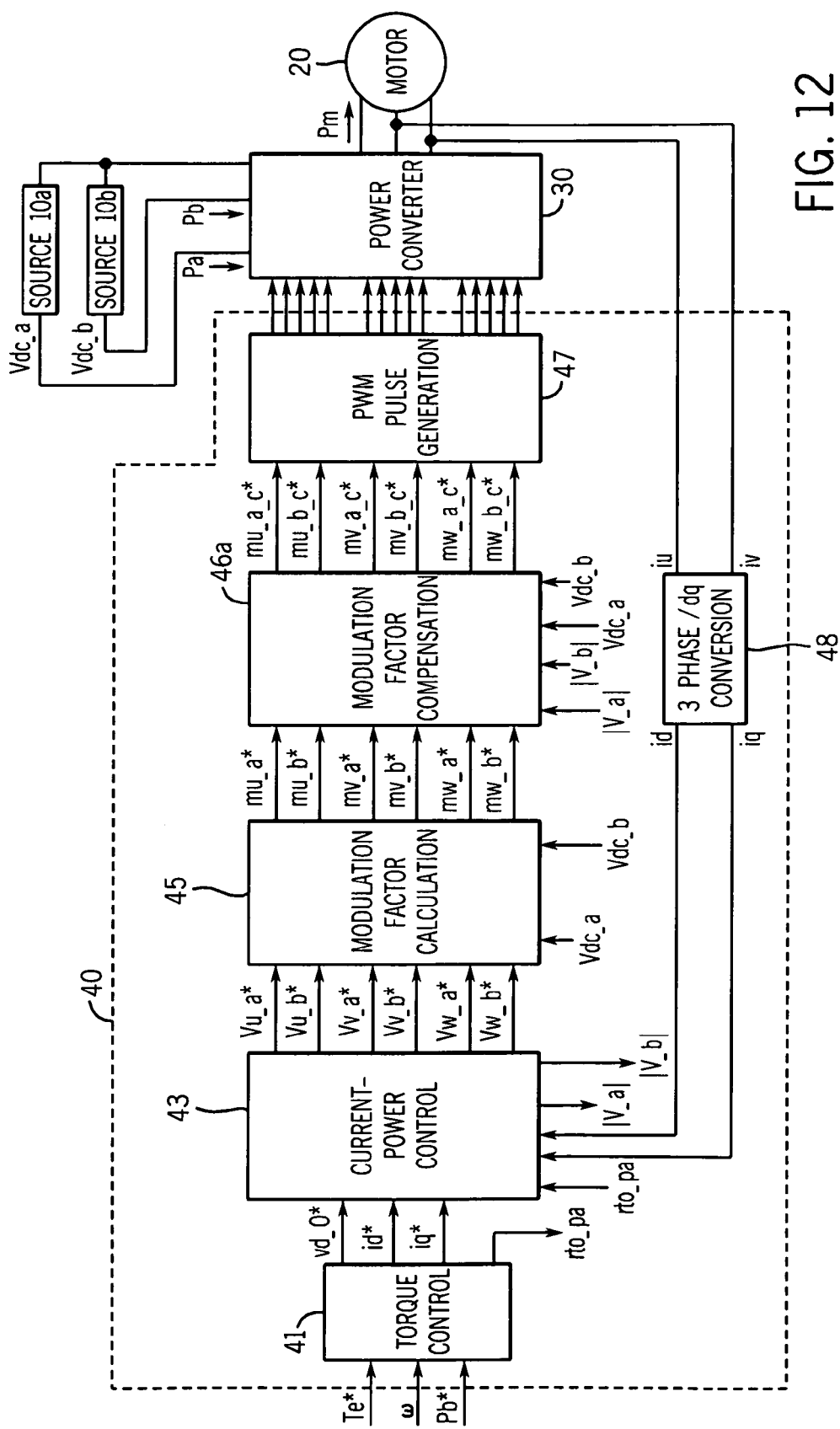
FIG. 12 is a diagram which shows the structure of the control system of a fourth exemplary embodiment.
Figure 13:
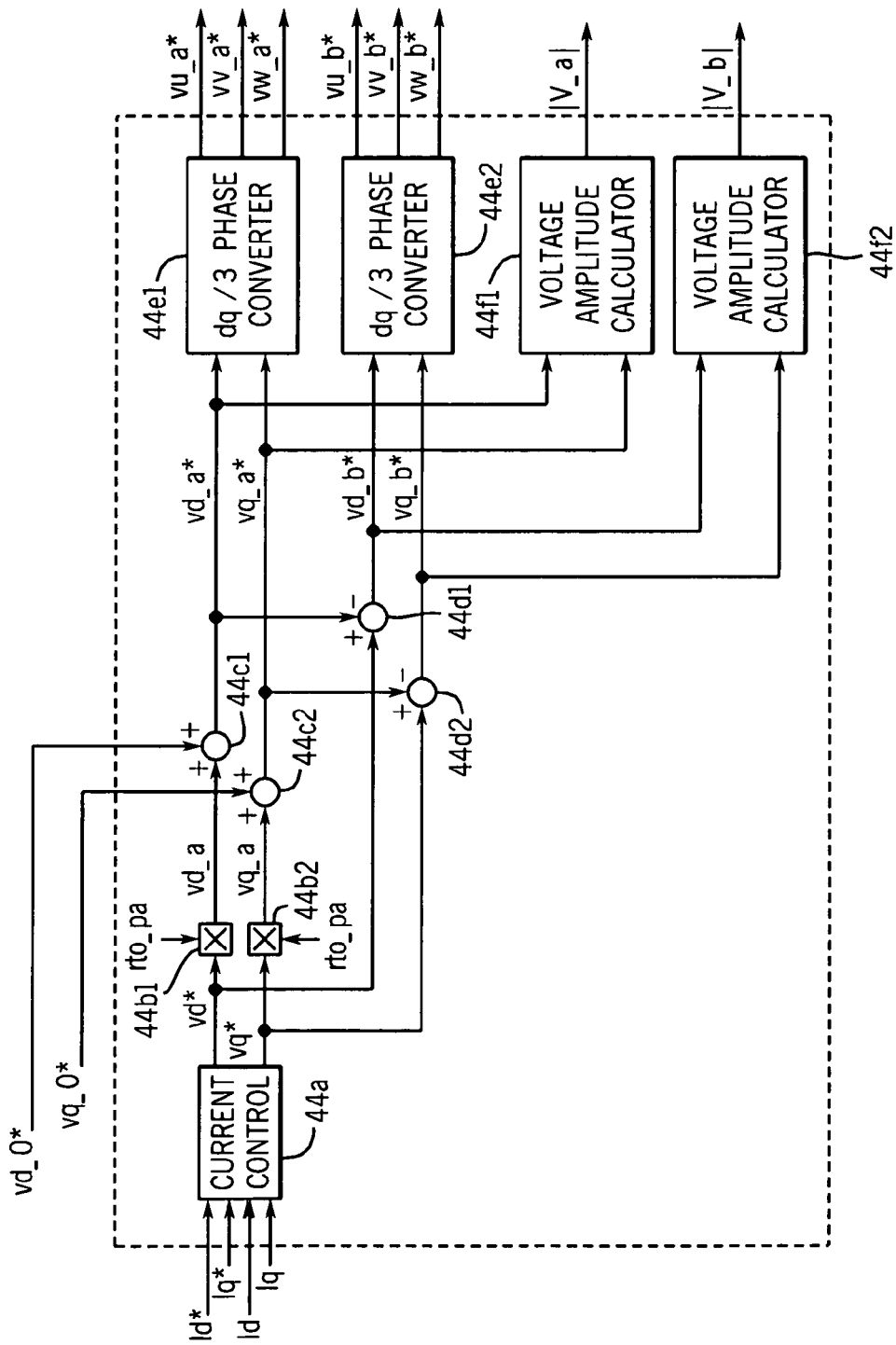
FIG. 13 is a detailed block diagram of the current-power control for the fourth exemplary embodiment.

The fourth exemplary embodiment comprises offset calculations. There is an explanation for the in the third exemplary embodiment, using FIG. 12 and FIG. 13, for only the differences with the second exemplary embodiment. FIG. 13 shows a detailed block diagram for the power control, and the current controller 44a, multipliers 44b1, 44b2, adders 44c1, 44c2, dq/3 phase converters 44e1, 44e2 process in the same way as the second exemplary embodiment, and furthermore the voltage amplitude calculators 44f1, 44f2 are compatible. In these calculations, there is obtained the magnitudes |V-a| and |V_b| of the voltage vectors of respectively a×b from vd_a*, vq_a*, vd_b*, and vq_b*.

$$|V_a| = \sqrt{(vd\_a^*)^2 + (vq\_a^*)^2}$$
$$|V_b| = \sqrt{(vd\_b^*)^2 + (vq\_b^*)^2}$$

The magnitude of these voltage vectors are used as below by substitution in FIG. 4 using the modulation factor compensator 46a. Using the source voltage Vdc_a, Vdc_b and the obtained |V_a| an |V_b|, there is performed compensation, according to the following equations, of the source 10a instantaneous modulation factor command mu_a* and source 10b instantaneous modulation factor command mu_b*.

$$m^*_{u\_a\_c} = m^*_{u\_a} - \frac{\left|\frac{V_b}{V_{dc\_b}}\right|}{\left|\frac{V_a}{V_{dc\_a}}\right| + \left|\frac{V_b}{V_{dc\_b}}\right|}$$

$$m^*_{u\_b\_c} = m^*_{u\_b} - \frac{\left|\frac{V_a}{V_{dc\_a}}\right|}{\left|\frac{V_a}{V_{dc\_a}}\right| + \left|\frac{V_b}{V_{dc\_b}}\right|}$$

In this way, even when calculating the compensating voltage command values, tt becomes possible to calculate the modulation factor compensation that corresponds to the voltage amplitude. In the first exemplary embodiment, in order to output the modulation factor command, there is maintained the time amplitude of the equivalent all the compensating voltage, and in this embodiment, there is obtained the time amplitude from the size of the voltage vector after calculation of the compensating voltage, and a margin is generated for the output voltage amplitude. In addition, there are no branching calculations as opposed to the compensating calculations of the first exemplary embodiment, and for the microcomputer which was necessary at calculation time for the branching calculations; it is possible to eliminate the calculators.

According to one aspect of the invention, according to the power output command value, by forming the motor current command value in the compensating voltage command value, there is supply to the motor from the power source, it is possible to adjust the power which is charging the power source from the motor. When the motor torque command is 0 or the motor revolutions speed is 0, the motor power is nearly 0 and by using this invention in current command value and compensating voltage command value is possible to realize with good accuracy and control power movement between voltage sources.

According to a different aspect of the invention, by referencing the map that was preformed, and corresponding to changes of the motor torque, motor revolutions speed, and power source power command value, it is possible to form the car at command value, the compensating voltage command value, and the power distribution ratio command value, and for every point of movement of the motor is possible to realize power movement between power sources.

According to another aspect of the invention, by forming the current component which does not generate torque as the current command value, when the motor torque command value is 0, along with matching the motor torque with the Indic here value, it is possible to supply to the motor current in order to realize power movement between the power sources.

According to a different aspect of the invention, with the d axis current of the alternating current motor as the current component which does not generate torque, by using the formation of the current command value, it is possible to supply to the motor current in order to realize power movement between power sources for a motor torque command value of 0.

According to another aspect of the invention, in order to perform calculation of the compensating voltage command in the dq coordinate system and operation of the power distribution ratio command value, for the motor control system which performs vector control in the dq coordinate system, the these calculated amounts end up being small compared to the calculation amounts using a three-phase alternating current.

According to another aspect of the invention, by calculating the modulation factor compensating value, it is possible to maintain a pulse formation time eight. For outputting the compensating voltage command value, it is possible to realize power movements among the power sources.

According to a different aspect of the invention, it is possible to calculate using calculated amounts for which in the modulation factor compensating value was small, it is possible to maintain a pulse generation time a. For output of the compensating power command value, it is possible to realize power movement among the power sources.

Various embodiments of the invention have been described. Modifications to the described embodiments can be made within the spirit of the invention. These and other embodiments are within the scope of the following claims.

The invention claimed is:

1. An electrical power converter comprising:
a first direct current line connected to a first direct current source;
a second direct current line connected to a second direct current source;
an alternating current line connected to an alternating current motor;
a motor torque controller that generates current command values for the alternating current motor and generates compensating voltage command values that correspond to charge target values from the first direct current source to the second direct current source based on a source power command value that commands the charge amount from the first direct current source to the second direct current source, a motor torque command value and a motor rotation speed;
a motor voltage controller that determines motor voltage command values according to the current command values;
a distributed voltage command value generator that determines command values of distributed voltage that the first direct current source and the second direct current source output to the alternating current motor based on a power distributed target value that corresponds respectively to the first direct current source and the second direct current source and the motor voltage command values;
a voltage command value compensator that determines compensating distributed voltage command values by adding the compensating voltage command values to the distributed voltage command values; and a pulse generator that generates an output voltage at the alternating current output according to the compensating distributed command values.

2. The electrical power converter of claim 1, wherein
the motor torque controller selects the current command value of the alternating current motor and the compensating voltage command values from the source power command value, the motor torque command value, the motor rotation speed and by referencing a predefined map.

3. The electrical power converter of claim 1, wherein
the motor torque controller selects the current command value for the alternating current motor that provides no torque for the alternating current motor when either the motor torque command value or the motor rotation speed is zero or near zero.

4. The electrical power converter of claim 3, wherein
the motor torque controller selects the current command value of the alternating current motor and selects the compensating voltage command value such that a motor loss of the alternating current motor is minimized when either the motor torque command value or the motor rotation speed is zero or near zero.

5. The electrical power converter of claim 4, wherein
the motor torque controller selects the current command value of the alternating current motor and selects the compensating voltage command value such that a power loss of the alternating current motor is minimized, and
the motor torque controller selects the current command value of the alternating current motor and selects the compensating voltage command value according to a inductance value of the alternating current motor, a carrier frequency, and the source power command value.

6. The electrical power converter of claim 5, wherein the current command value of the alternating current motor is $$Id^* = -\frac{\sqrt{Pb^*}}{\sqrt{2\sqrt{2}\,L_d f_c}},$$

the compensating voltage command value is $$V_{d\_0}* = -\sqrt{2\sqrt{2}\,L_d f_c Pb*},\text{ and}$$

Id* represents a d axis current command value, Vd_0* represents a compensating voltage command value, Pb* represents a source power command value, Ld represents a motor d axis inductance value, and fc represents a carrier frequency.

7. The electrical power converter of claim 3, further comprising
a motor loss command generator that generates a motor loss command value; and
a loss calculator that calculates a motor loss,
wherein the motor current command value generator selects a current command value of the alternating current motor and selects a compensating voltage command value such that the motor loss matches the motor loss command value.

8. The electrical power converter of claim 1, wherein
the motor torque controller selects the compensating voltage command value to be a dq axis compensating voltage command value,
the motor voltage controller determines a dq axis motor voltage command value according to a dq axis current command value,
the voltage command value compensator obtains a dq axis distributed voltage command value by calculating the product of a power distribution ratio command value and the dq axis motor voltage command value, and
the voltage command value compensator calculates a dq axis compensating voltage command value.

9. The electrical power converter of claim 1, wherein
the voltage command value compensator calculates a modulation factor compensating value from a modulation factor command value by normalizing a compensating distributed voltage command value according to a source voltage value of the first direct current source, a source voltage value of the second direct current source, and a power distribution ratio command value,
the voltage command value compensator determining the compensating voltage command value, according to the value of the calculated modulation factor compensating value from the modulation factor command value.

10. The electrical power converter of claim 1, further comprising
a can voltage command value compensator,
wherein the can voltage command value compensator calculates a modulation factor command value that normalized the distributed voltage command value to a source voltage value of the first direct current source,
the can voltage command value compensator calculates a modulation factor compensating value from the source voltage values of the first direct current source and the second direct current source and the distributed voltage command value, and
the voltage command value compensator determines the compensating distributed voltage command value based on the modulation factor compensation value and the modulation factor command value.

11. The electrical power converter of claim 1, wherein
the first direct current source is a fuel cell, and the second direct current source is a battery.

12. An electrical power converter comprising:
a first direct current line connected to a first direct current source;
a second direct current line connected to a second direct current source;
an alternating current line that drives an alternating current motor;
a motor torque control means that generates current command values for the alternating current motor and generates compensating voltage command values that correspond to charge target values from the first direct current source to the second direct current source based on a source power command value that commands the charge amount from the first direct current source to the second direct current source, a motor torque command value and a motor rotation speed;
a motor voltage control means that determines motor voltage command values according to the current command values;
a distributed voltage command value calculation means that generates command values of distributed voltage that the first direct current source and the second direct current source output to the alternating current motor based on a power distributed target value that corresponds respectively to the first direct current source and the second direct current source and the motor voltage command values;

a voltage command value compensate means that determines compensating distributed voltage command values by adding the compensating voltage command values to the distributed voltage command values; and a pulse generate means that generates an output voltage at the alternating current output according to the compensating distributed command values.

13. A method of controlling an electrical power converter comprising:

generating current command values for an alternating current motor;

generating compensating voltage command values that correspond to charge target values from a first direct current source to a second direct current source based on a source power command value that commands the charge amount from the first direct current source to the second direct current source, a motor torque command value and a motor rotation speed;

determining motor voltage command values according to the current command values;

generating command values of distributed voltage that the first direct current source and the second direct current source output to the alternating current motor based on a power distributed target value that corresponds respectively to the first direct current source and the second direct current source and the motor voltage command values;

determining compensating distributed voltage command values by adding the compensating voltage command values to the distributed voltage command values; and generating an output voltage to power the alternating current motor according to the compensating distributed command values.

14. The method of claim 13, wherein the electrical power converter generates a driving voltage for the alternating current motor by generating and synthesizing pulses from any of the respective output voltages of the first direct current source and the second direct current source.

* * * * *